(12) United States Patent
Maier et al.

(10) Patent No.: US 9,802,144 B2
(45) Date of Patent: Oct. 31, 2017

(54) MODULAR FILTER SYSTEM, HOUSING FRAME PART OF A MODULAR FILTER SYSTEM, FILTER MODULE AND HOUSING MODULE

(71) Applicant: MANN+HUMMEL GMBH, Ludwigsburg (DE)

(72) Inventors: Fabian Maier, Westheim (DE); Jessica Wetzel, Ludwigshafen (DE); Julian Buechler, Marienheide (DE); Oliver Luley, Speyer (DE); Lijith Sathyanathan, Bangalore (IN); Suresh Aragbatagangapa Eswarapa (A.G.E.), Bangalore (IN); Steffen Ackermann, Harthausen (DE); Chowalloor Rapheal Antomon, Bangalore (IN)

(73) Assignee: MANN+HUMMEL GMBH, Ludwigsburg (DE)

( * ) Notice: Subject to any disclaimer, the term of this patent is extended or adjusted under 35 U.S.C. 154(b) by 165 days.

(21) Appl. No.: 14/800,040

(22) Filed: Jul. 15, 2015

(65) Prior Publication Data

US 2017/0014744 A1    Jan. 19, 2017

(51) Int. Cl.
*B01D 46/00*    (2006.01)

(52) U.S. Cl.
CPC ....... *B01D 46/0013* (2013.01); *B01D 46/002* (2013.01); *B01D 46/0002* (2013.01); *B01D 46/0005* (2013.01)

(58) Field of Classification Search
CPC ............ B01D 46/0002; B01D 46/0005; B01D 46/0013; B01D 46/002; B01D 46/0021
See application file for complete search history.

(56) References Cited

U.S. PATENT DOCUMENTS

| 5,435,915 | A | 7/1995 | Connors, Jr. |
| 6,264,713 | B1 * | 7/2001 | Lewis, II ........... B01D 46/0005 55/481 |
| 2011/0023721 | A1 | 2/2011 | Tanis et al. |
| 2014/0202122 | A1 | 7/2014 | Golub et al. |

FOREIGN PATENT DOCUMENTS

DE    102011120387 A1    6/2012

* cited by examiner

*Primary Examiner* — Robert Clemente

(57) ABSTRACT

A modular filter system (10) for cleaning of gaseous fluid has at least one housing module (16) with at least one support (18) in which at least one filter element (20) is arranged and at least one duct for the gaseous fluid on the clean side of the at least one filter element (20). At least one housing module (16) has at least one housing frame part (24) which comprises at least one support section (38). The at least one support section (38) is suitable for realizing at least one support (18). The at least one housing frame part (24) has at least one duct section (40). The at least one duct section (40) is suitable for realizing at least one duct or duct part (22). The at least one housing frame part (24) can be applied in the housing module (16) such, that its at least one support section (38) can form at least one support (18) and/or its at least one duct section (40) can form at least one duct.

11 Claims, 24 Drawing Sheets

MODULAR FILTER SYSTEM, HOUSING FRAME PART OF A MODULAR FILTER SYSTEM, FILTER MODULE AND HOUSING MODULE

TECHNICAL FIELD

The present invention relates to a modular filter system for cleaning of gaseous fluid, in particular air, comprising at least one housing module with at least one support in which at least one filter element is arranged and at least one duct for the gaseous fluid on the clean side of the at least one filter element.

Further, the invention relates to a housing frame part of a housing module of a modular filter system for cleaning of gaseous fluid, in particular air, wherein the housing module comprising at least one support for at least one filter element and at least one duct or duct part for the gaseous fluid on the clean side of the at least one filter element.

Furthermore, the invention relates to a filter module of a modular filter system for cleaning of gaseous fluid, in particular air, comprising at least one housing module with at least one support in which at least one filter element is arranged and at least one duct or duct part for the gaseous fluid on the clean side of the at least one filter element.

Moreover, the invention relates to a housing module of a modular filter system for cleaning of gaseous fluid, in particular air, wherein the housing module comprising at least one support for at least one filter element and at least one duct or duct part for the gaseous fluid on the clean side of the at least one filter element.

BACKGROUND

The US 20140202122 A1 discloses a modular design for large pulse jet fabric filters (PJFF), which is divided into similar compartments, which are each "shop-fabricated" in quarter sections prior to delivery to the power plant site. The quarter sections of the compartments are modular and sized so that they can be fabricated at a shop located away from the power plant site and transported by truck over public roads to the power plant site. Once delivered to the site, the quarter sections are bolted together and seal welded to form a PJFF compartment, without requiring additional internal fabrication or welding. The assembled compartment is then lifted onto the support structure as an assembled unit and bolted and/or welded in place. The additional components of the PJFF may also be shop-fabricated offsite to further the benefits of the modular design.

SUMMARY OF THE INVENTION

It is an object of the invention to provide a modular filter system, a housing frame part, a filter module and a housing module of the above-mentioned kind, where the parts of the modular filter system can be combined more flexible. Further the number of diverse components required should be reduced. In particular, the diversity of required components should be reduced.

The object is achieved by the modular filter system in that at least one housing module has at least one housing frame part which comprises at least one support section, wherein the at least one support section is suitable for realizing at least one support, and said at least one housing frame part comprises at least one duct section, wherein the at least one duct section is suitable for realizing at least one duct or duct part, wherein the at least one housing frame part optional can be applied in the housing module such, that its at least one support section can be part of or form at least one support and/or its at least one duct section can be part of or form at least one duct.

According to the invention, at least one housing frame part can be used in at least one housing module in different ways. The at least one housing frame part optionally can have different functions and/or orientations in the at least one housing module. In this way, at least one housing frame part of one design can be used in multiple ways. Thus, the number of different components needed for the modular filter system can be reduced. The diversity of required components can be reduced. So, an expenditure in production, materials, supplies and sampling can be minimized.

Advantageously, at least one housing frame part can comprise or consist of plastic.

Multiple housing frame parts of the same design can be combined in different ways to generate the modular filter system as needed. Modular filter systems of different sizes and/or forms can be created by using only one type of the inventive housing frame part mainly.

Advantageously, at least one support section of at least one housing frame part on its own or in combination with at least one support section of at least one adjacent housing frame part can form at least one support for at least one filter element.

Alternatively or additionally, advantageously at least one duct section of at least one housing frame part on its own or in combination with at least one duct section of at least one adjacent housing frame part can form at least one duct or duct part.

In general, at least one housing frame part can be used as a support for the at least one filter element as well as a duct or duct part for the fluid flow. So, a number of different parts can be reduced. In particular, no additional duct parts are required.

Advantageously, at least one housing module can comprise multiple housing frame parts which form at least one support for at least one filter element and at least one duct or duct part for the fluid. Advantageously, multiple housing frame parts can be fixed together to form at least one housing module.

Favorably, a complete housing of the modular filter system can comprise only one housing module or multiple housing modules can be connected individually to form a bigger housing. So, a larger down flow surface can be created for adapting the modular filter system to different individual requirements.

The modular design allows connection of multiple filter modules each comprising at least one housing module with at least one filter element and at least one duct part. The filter modules can be combined based on different fluid flow requirements. Thus, a filter capacity easy can be expanded. With the inventive modular filter system a fluid filtration solution for a flow rate requirement from approximately 20 m³/min, 50 m³/min or 100 m³/min to approximately 1000 m³/min or more can be realized.

Advantageously, multiple housing modules can be stacked together in flow direction in the at least one duct or duct part. Additionally or alternatively, multiple housing modules can be stacked together in direction perpendicular to the flow direction in the at least one duct or duct part. In particular, two, three or more housing modules can be stacked together.

At least two housing modules can be attached particularly with at least one mounting location, in particular at least one mounting section, side-by-side. The at least one mounting location can be horizontal, which means that it acts in direction of the fluid duct or duct part.

Alternatively or additionally, at least one housing module can be mounted particularly with mounting locations, in particular mounting sections, on the top of another housing module. Those mounting locations can be vertical, which means that they act cross to the fluid duct or duct part. The housing modules can be mounted or stacked one above the other.

Advantageously, the modular filter system can comprise at least one sealing means. At least one sealing means can seal at least one duct or duct part. At least one sealing means can be arranged between two housing modules of the modular filter system. A sealing arrangement, in particular at least one sealing means, can circumscribe a fluid flow aperture of a duct or duct part. The sealing arrangement can project on the outside of the housing frame parts. Alternatively, the at least one sealing means can seal against at least one functional component of the modular filter system.

Favorably, at least one functional component of the modular filter system can comprise at least one filter element, at least one means for pre-separation, an outlet plate, a closing end plate, at least one secondary filter and/or at least one cover assembly.

An outlet plate can comprise a fluid outlet of the modular filter system.

A closing end plate can close at least one duct or duct part on a side opposite to a fluid outlet.

At least one secondary filter element can be placed upstream of a fluid outlet of the modular filter system.

Advantageously, at least one sealing means can comprise or consist of at least one gasket, in particular at least one air-sealing gasket.

Favorably, in a normal mounting orientation, at least one support for at least one filter element can be on a vertical side of the at least one housing module. Thus, a servicing of the at least one filter element can be done in a horizontal direction. So, the at least one filter element can be fully visible and/or accessible. An easy access can simplify monitoring and replacement.

Favorably, a direction of fluid flow in the modular filtration system can be in a unique way. The fluid can enter the modular filtration system through the filter elements. At least two filter elements can be placed on opposite sides of a fluid duct relating to the direction of fluid flow. The filter elements can have a sideways opening. The filter elements can be separated by at least one, favorably two, inner housing frame parts in the middle between two outer housing frame parts for supporting the filter elements. The inner housing frame parts can realize the duct or duct part. So, the common duct or duct part can be used for at least two filter elements. The cleaned fluid can flow through the common duct or duct part. Such a fluid flow direction can allow lesser restrictions. The at least one duct or duct part can provide a bigger volume for the fluid flow.

The modular filter system can be realized in a single stage or two or more stages dependent on the requirement. Favorably, the modular filter system can be provided with at least one means for pre-separation. The at least one means for pre-separation can form a first stage of the modular filter system. With at least one means for pre-separation particles, in particular dust particles, can be removed before the fluid reaches the at least one filter element. At least one filter element can form a second stage. Optionally, at least one secondary filter element can form a third stage. In total, the modular filter system can be customized depending upon fluid flow and particulate removal requirements of each intended application.

Advantageously, at least one means for pre-separation can comprise at least one cyclone assembly. At least one cyclone assembly can comprise at least one cyclone cell. At least one cyclone assembly can be made up of a frame, at least one cyclone cell for pre-separation and a dust dump valve for dust discharge. The frame can be provided with slots to which the at least one cyclone cell can be fixed. Further the frame can have a provision for fixing the at least one dust dump valve.

Alternatively or additionally, Advantageously, at least one means for pre-separation can comprise at least one foam. At least one means for pre-separation can comprise a frame with a grid at the front. The foam can be placed in front of an inlet of the frame. The foam can be supported by the grid. The foam can filter dust particles with certain specific sizes.

Advantageously, at least one housing frame part can be a equipped with at least one mounting means or arrangement, at least one joining means or arrangement, at least one supporting means or arrangement, in particular at least one supporting surface and/or supporting rib, at least one guide slot, at least one sealing guide, in particular a sealing groove, at least one filter element, at least one means for pre-separation and/or at least one secondary filter element. So, the modular filter system can offer an increased flexibility. At least one housing frame part can be standardized. Thus, the flexibility further can be improved.

At least one housing frame part which is equipped with ribs can be more rigid. Thus, in particular a support for at least one filter element can be improved.

The invention is not limited for filtering air. The invention also can be used for cleaning, in particular filtering, of other kinds of gaseous fluids. Particularly, the modular filter system can be used in combination with a vehicle, particularly a motor vehicle, a rail vehicle, a water vehicle or an aircraft. Additionally or alternatively, the invention can be used with a machine, in particular a construction machine or an agricultural machine. Additionally or alternatively, the invention can be used with a system for heating, ventilation and/or air conditioning.

According to a favourable embodiment of the invention, the housing module can comprise at least three, in particular four, housing frame parts which optional can be combined in at least two ways such, that the housing frame parts form at least one duct or duct part and at least one support for at least one filter element.

Favorably, with two housing frame parts a duct or duct part can be realized. With a third housing frame part at least one support for at least one filter element can be realized.

Alternatively, two inner housing frame parts can realize the duct or duct part in the middle of the housing module. Two outer housing frame parts can be attached to the two inner housing frame parts on opposite sides for realizing two supports each for one filter element.

Favorably, a housing module may comprise four housing frame parts and two filter elements and can have a width of approximately 1 m, a height of approximately 0.5 m and a length in direction of the duct or duct part of approximately 0.5 m. Alternatively, a housing module may comprise two or three housing frame parts and one filter elements and can have a width of approximately 0.5 m or 0.75 m, a height of approximately 0.5 m and a length in direction of the duct or duct part of approximately 0.5 m. In a variant with three housing frame parts per housing module, one frame part may preferably be used for establishing a common duct. Multiple housing modules can be combined in a longitudinal direction, so that the length of the whole modular filter system can be a multiple of the length of one of the housing modules. The duct parts of the housing modules can be connected in a row in longitudinal direction to one main duct in the middle of the modular filter system.

According to a further favourable embodiment of the invention, at least one housing frame part can comprise at least one joining section for joining with at least one adjacent housing frame part and/or for joining with at least one functional component of the modular filter system.

Multiple housing frame parts can be secured together along according joining sections for realizing at least one housing module or for combining multiple housing modules.

Additionally or alternatively, at least one housing frame part can be secured with at least one functional component along according joining sections.

Functional components of the modular filter systems can be formed as modules themselves. Multiple, in particular different, functional components can be combined.

Advantageously, at least one housing frame part can have a possibility for connecting at least one cover assembly. The at least one cover assembly can be fixed to at least one housing frame part.

Favorably, at least one cover assembly can be used for assembling at least one means for pre-separation and/or for holding at least one filter element. Alternatively or additionally, at least one cover assembly can be used for covering an inlet side of at least one filter element.

Favorably, at least one cover assembly can comprise at least one lock assembly. At least one lock assembly can comprise at least one clamp, in particular at least one wire clamp. With at least one lock assembly, at least one cover assembly can be fixed at the at least one housing frame part. Additionally or alternatively, at least one functional component can be fixed at the at least one cover assembly by use of at least one lock assembly. At least one cover assembly, in particular at least one lock assembly, can ensure proper sealing of the dirty side of at least one installed filter element from the clean side.

At least one cover assembly can comprise or consist of a plastic frame.

According to a further favourable embodiment of the invention, at least one housing frame part can comprise at least one mounting section for mounting at least one adjacent housing frame part and/or the at least one functional component of the modular filter system.

At least one housing frame part can provide at least one horizontal mounting section and/or at least one vertical mounting section. A horizontal mounting section can act in direction of the fluid duct or duct part. A vertical mounting section can act cross to the fluid duct or duct part.

With the mounting sections, adjacent housing modules can be fixed together. Additionally or alternatively, at least one functional component can be fixed to at least one housing frame part by use of at least one mounting section.

Advantageously, at least one housing frame part can comprise at least one means for fixing and/or guiding at least one lock assembly and/or at least one guiding means of at least one functional component, in particular at least one cover assembly. At least one means for fixing and/or guiding can be on a side of at least one housing module. Additionally and/or alternatively, at least one means for fixing and/or guiding can be on a side of at least one functional component. At least one means for fixing and/or guiding can comprise at least one slot. At least one corresponding guiding means can comprise at least one projection.

According to a further favourable embodiment of the invention, at least one housing frame part can comprise at least one frame part guiding means for guiding at least one appropriate component guiding means of at least one functional component of the modular filter system.

Advantageously, at least one housing frame part guiding means can comprise or consist of at least one guide slot. With the at least one housing frame part guiding means at least one functional component can be guided to the at least one housing frame part. Thus, means for locking the at least one functional component with the at least one housing frame part can be brought together.

Favorably, at least one housing frame part guiding means can ensure that locking assemblies of functional components being locked with the correct parts of the at least one housing frame part. Particularly, at least one housing frame part guiding means can ensure that possible lock clamps can be locked only at corresponding pockets. Particularly, at least one lock clamp can be on the side of the at least one functional component and at least one pocket can be on the side of the at least one housing frame part or vice versa.

Advantageously, at least one functional component in form of a cover assembly can comprise at least one component guiding means in form of a guiding projection. The at least one component guiding means can cooperate with an appropriate housing frame part guiding means for guiding the at least one cover assembly to the at least one housing frame part while locking the cover assembly.

According to further favorable embodiment of the invention, at least one housing frame part, in particular at least one support of the at least one housing frame part, can comprise at least one supporting means, in particular at least one supporting surface and/or supporting rib.

At least one supporting surface and/or at least one supporting rib can be provided inside the housing module, in particular inside the support of at least one housing frame part. The at least one supporting surface and/or supporting rib can support at least one filter element.

The at least one supporting surface and/or supporting rib can be realized such, that the at least one filter element can be supported vertically in a normal mounting orientation of the housing module. So, the at least one supporting surface and/or supporting rib can support the filter element against gravity.

Favorably, at least one supporting rib and/or supporting surface can engage on a circumferential side of the at least one filter element. Particularly, the at least one filter element can have polyurethane foam on its circumferential side. At least one supporting rib and/or supporting surface can engage the entire peripheral polyurethane foam of the at least one filter element.

Favorably, at least one, in particular each filter element can independently be supported at a bottom. Thus, at least one filter element can be installed or removed without effecting adjacent filter elements particularly of adjacent housing modules.

According to a further favorable embodiment of the invention, at least one housing frame part can comprise at least one sealing guide for at least one sealing means, in particular a gasket, with at least one sealing guide joining section and at least one sealing guide end section.

At least one housing frame part can comprise at least one part of at least one sealing guide for at least one appropriate sealing means, in particular at least one gasket. At least one sealing means can be placed in/on at least one sealing guide. At least one sealing guide can hold the at least one sealing means.

At least one sealing guide joining section of one housing frame part can be connected to an appropriate sealing guide joining section of an adjacent housing frame part for completing at least one sealing guide.

Advantageously, at least one sealing guide joining section and at least one sealing guide end section can be arranged such, that they can be used optionally.

In cases where the at least one housing frame part being used as an inner housing frame part of a housing module, its at least one inner sealing joining section can be used for connecting with at least one corresponding inner sealing joining section of at least one adjacent housing frame part. Its at least one outer sealing guide joining section can be used for completing the sealing guide together with at least one corresponding sealing joining section of at least one adjacent outer housing frame part.

In cases where the at least one housing frame part being used as an outer housing frame part of a housing module, its at least one sealing guide end section can be used for completing the sealing guide. Its at least one outer sealing guide joining section is not used.

According to a further favourable embodiment of the invention, at least one housing frame part can have a U-shaped profile.

The open side of the U-shaped profile can be connected to an open side of an adjacent U-shaped housing frame part or to a close side of an adjacent U-shaped housing frame part.

The interior of the U-shaped housing frame can act as a part of at least one duct or duct part and/or at least as a part of at least one support for at least one filter element.

According to a further favourable embodiment of the invention, at least one housing frame part can have a rectangular shape. With rectangular housing frame parts a rectangular shaped housing module can be realized.

Advantageously, at least one housing module can be a frame made into a rectangular concept.

According to a further favourable embodiment of the invention, at least one housing frame part can be a half shell. So, with two or more half shell housing frame parts at least one symmetrical housing module can be realized.

According to a further favourable embodiment of the invention, at least one housing module can comprise at least two identical housing frame parts. Thus, the number of part types for realizing at least one housing module can be reduced.

According to a further favourable embodiment of the invention, at least one filter element can be rectangular shaped.

Due to the rectangularity an entire space in particular of an rectangular support of the according at least one housing frame part can be utilized. Thus, a surface area of the at least one filter element, which is active for filtration, can be improved.

Advantageously, at least one rectangular shaped filter element easy can be supported by the support of the at least one housing frame part. A rectangular shaped filter element securely can seal into a rectangular housing frame part.

Favorably, at least one filter element can have at least one sealing means for sealing a clean side from a dirt side when the at least one filter element is installed into the support of the at least one housing module. Particularly, at least one sealing means can comprise or consist of foam, in particular polyurethane (PU) foam.

Advantageously, at least one filter element can have a bellow of filter medium. The bellow can have a rectangular shape.

Advantageously, at least one filter element can have a pleated filter medium. The depth of the pleats in flow direction of the fluid through the at least one filter element can be large compared to the extension of the filter element perpendicular to the flow direction. Filter elements with comparatively deep pleats can have larger filtration area compared to filter elements with more flat pleats. Further, a dust holding capacity can be improved by using pleats with improved depth.

At least one filter element can be suitable for enabling a flow rate of approximately 50 $m^3$/min.

Further, the object is achieved by the housing frame part in that the housing frame part comprises at least one support section, wherein the at least one support section is suitable for realizing at least one support, and the housing frame part comprises at least one duct section, wherein the at least one duct section is suitable for realizing at least one duct or duct part, wherein the housing frame part optional can be applied in the housing module such, that its at least one support section can be part of or form at least one support and/or its at least one duct section can be part of or form at least one duct.

Furthermore, the object is achieved by the filter module in that at least one housing module having at least one housing frame part which comprises at least one support section, wherein the at least one support section is suitable for realizing at least one support, and said at least one housing frame part comprises at least one duct section, wherein the at least one duct section is suitable for realizing at least one duct or duct part, wherein the at least one housing frame part optional can be applied in the housing module such, that its at least one support section can be part of or form at least one support and/or its at least one duct section can be part of or form at least one duct.

Moreover, the object is achieved by the housing module in that the housing module has at least one housing frame part which comprises at least one support section, wherein the at least one support section is suitable for realizing at least one support, and said at least one housing frame part comprises at least one duct section, wherein the at least one duct section is suitable for realizing at least one duct or duct part, wherein the at least one housing frame part optional can be applied in the housing module such, that its at least one support section can be part of or form at least one support and/or its at least one duct section can be part of or form at least one duct.

The above-mentioned advantages and characteristic features of the inventive modular filter system, the inventive housing frame part, the inventive filter module and the inventive housing module apply analogously among each other. The single advantages and characteristic features can be combined among each other.

Another object is to provide a filter module as well as a system for filtering large airflow volumes which enables the filtering of large airflow volumes at reduced manufacturing costs and variable installation space geometry.

This object is achieved by a filter module for a system for filtering large airflow volumes comprises a particularly block-shaped frame that is capable of enclosing at least one filter element and preferably two filter elements. The frame encloses the filter element, can be firmly connected thereto or embodied as a frame for a replaceable filter element and can impart a certain level of stability to the filter element. The frame can be used in the filter element as an end place, for example, for adhering or pouring a filter medium of the filter element. Alternatively, the filter medium can also be connected directly to the frame, for example by means of infrared welding, mirror welding, etc. Moreover, an embodiment with a replaceable filter element and a self-bearing frame is also possible.

This object is also achieved by a system for filtering large airflow volumes, comprising at least one of the filter modules mentioned in the above paragraph and an end element for closing the inflow opening of a filter module The filter module has an outer, raw-side inflow region. Raw-side intake air can enter the filter element via this inflow region, which is embodied so as to be flat, for example. Preferably, two opposing inflow regions are formed by two opposing sides of a box-shaped housing or filter module. The filter module has an outer clean-side outflow opening through which the filtered intake air can leave the filter module. In addition, the filter module has an outer clean-side inflow opening which preferably lies across from the clean-side outflow opening. In the case of a box-shaped housing with two opposing inflow regions and opposing clean-side inflow and outflow openings, the two remaining, preferably opposing sides of the box are preferably close but can also be used to connect additional filter modules or as additional inflow regions for other filter elements. Via the inflow opening, filtered intake air can already get into the interior of the filter in adjacent filter modules without going through a filtering process again. Accordingly, the filter module has an inner clean-side flow channel which connects the outflow opening and inflow opening to each other. It is thus possible to conduct within the filter module intake air that has already been cleaned. In this way, a plurality of filter modules can be connected together geometrically in series but in parallel with respect to the through-flow of the inflow regions and filter elements, in each case through the connection of the clean-side inflow and outflow opening, to form a filter system in such a way that a common clean channel is formed. At the outflow opening of the last filter module, the clean air can thus be discharged from all filter modules for further use. Moreover, the filter module preferably has connecting means on its outer side. The connecting means enable a connection of the outflow opening to an inflow opening of an adjacent filter module. Simultaneously or alternatively, connecting means can be provided at the inflow opening which enable connection of the inflow opening to an outflow opening of an adjacent filter module. The filter module according to the invention can thus be connected serially with adjacent filter modules via the connecting means. It is thus possible to scale the filtering capacity of a system that uses such modules through the successive connection of individual filter modules. At the same time, the individual filter modules can be structurally identical, thus enabling cost-effective manufacture.

One preferred embodiment makes a provision that the connecting means is arranged on the frame. The frame thus performs a dual function. It encloses the optionally replaceable filter element and can support the filter element at least partially. At the same time, the frame can be used for connecting to an adjacent filter module. This enables especially simple combination of the filter modules without the need for additional support elements.

One likewise advantageous embodiment makes a provision that the flow channel has a support element. When there is flow through the filter element from the outside to the inside, pressure occurs against the filter element. When the collapsing pressure is exceeded, the filter element deforms and loses a portion of its filter function. An internal support element, which can be embodied as a supporting tube or, in the case of flat filter elements, as a supporting mesh, enables the collapsing pressure of the filter module to be increased.

One advantageous development of the invention makes a provision that the support element is supported on the frame. The support element thus increases not only the collapsing pressure of the filter element but also the overall rigidity of the filter module.

One preferred embodiment of the invention makes a provision that a seal is provided on the outside in the area of the outflow opening and/or of the inflow opening for connecting the outflow opening to an inflow opening and/or the inflow opening to an outflow opening of an adjacent filter module. Through a seal on the connecting sides of the filter module, filter modules can be interconnected in an airtight manner.

Advantageously, the connecting means have a possibility for a non-positive and/or positive connection. In conjunction with the frame, the setup of interconnected filter modules is thus made possible. Any tolerance fluctuations of the filter modules can thus be compensated, for example by means of short mounting lengths. Due to the flat, non-positive connection of the filter modules, self-supporting filter systems can also be created. Depending on the application, support rails or special adjustments can be used for support. It is also possible to support the filter system by means of a base support. A stacking of the modules or systems is also possible.

One preferred embodiment makes a provision that the connecting means has a wedge-shaped frame profile and an associated slide element.

The object is further achieved by a system for filtering large airflow volumes with at least one filter module according to the invention as well as an end element for closing the inflow opening of a filter module. The end element can have a connecting means that corresponds to the connecting means of the filter module.

One inventive development of the invention makes a provision that the system comprises an adapter module, the adapter module having connecting means for connecting to the outflow opening into the filter module and connecting means for connecting to an intake air line. A filter module can thus be connected to the intake air line. Other filter modules can be connected to the inflow opening of the filter module. The filter module furthest removed from the intake air line can be sealed with an end element at the inflow opening of the filter module.

One especially preferred development of the invention makes a provision that the system comprises an intermediate module, the intermediate module having outflow connecting means for connecting to the outflow opening of a filter module and inflow connecting means for connecting to the inflow opening of a filter module, the outflow connecting means and the inflow connecting means being arranged such that preferential flow directions of flow channels are arranged so as to be offset from the filter modules connected to the intermediate modules and/or at an angle to each other. It is thus possible with the intermediate module to offset the preferential flow direction of individual filter modules with respect to each other or to arrange them at an angle and thus to open up installation spaces that cannot be reached with a flush arrangement of the flow channels of individual filter modules. This enables a three-dimensional arrangement of the modules. What is more, intermediate modules can be provided with additional functions, such as recording systems for measuring units, sensor systems, etc.

One likewise advantageous development of the invention makes a provision that the system comprises a branching module, the branching module having an inflow opening and associated connecting means for connecting to the outflow opening of a first filter module and an outflow opening and associated connecting means for connecting to the inflow opening of a second filter module as well as at least one other inflow opening and associated connecting means for connecting to the outflow opening of another filter module and/or at least one other outflow opening and associated connecting means for connecting to the inflow opening of another filter module. By means of such a branching module, the flow channel resulting from the different connected filter modules can be branched, thus opening up additional installation spaces.

The filter module according to the invention is characterized in that the frame of the module opens up the possibility of coupling the module to adapter elements and/or to other filter modules. Through a sealing system on the connecting sides of the filter module, the filter modules can be tightly interconnected and a filter module can be tightly connected to adapter elements. The frame material can be adapted depending on the requirements of the application. For example, plastic, plastic with UL, as well as metal can be used.

In the assembled state, the module frames are arranged in a row. The module frames are each interconnected non-positively and/or positively. Tolerance fluctuations of the filter modules can be compensated due to short mounting lengths (frame collar on frame collar or module on module). The tolerances of individual modules add up over the entire length of the filter system but have no influence on the connection of the individual filter modules to each other or on the pressing of the seal elements. Alternatively to the connecting elements mentioned, a clamping of several filter modules by tie anchor can be provided. Depending on the application, it is also possible to support the connected modules via a rail system or to place or stand them on the floor.

BRIEF DESCRIPTION OF DRAWINGS

The present invention together with the above-mentioned and other objects and advantages may best be understood from the following detailed description of the embodiments, but not restricted to the embodiments, wherein is shown schematically FIG. 1 a modular air filter system with five filter modules, an end plate, an outlet plate and a secondary filter element, wherein each filter module comprises one housing module each with four housing frame parts, two filter elements and two cyclone assemblies.

Figure 1:
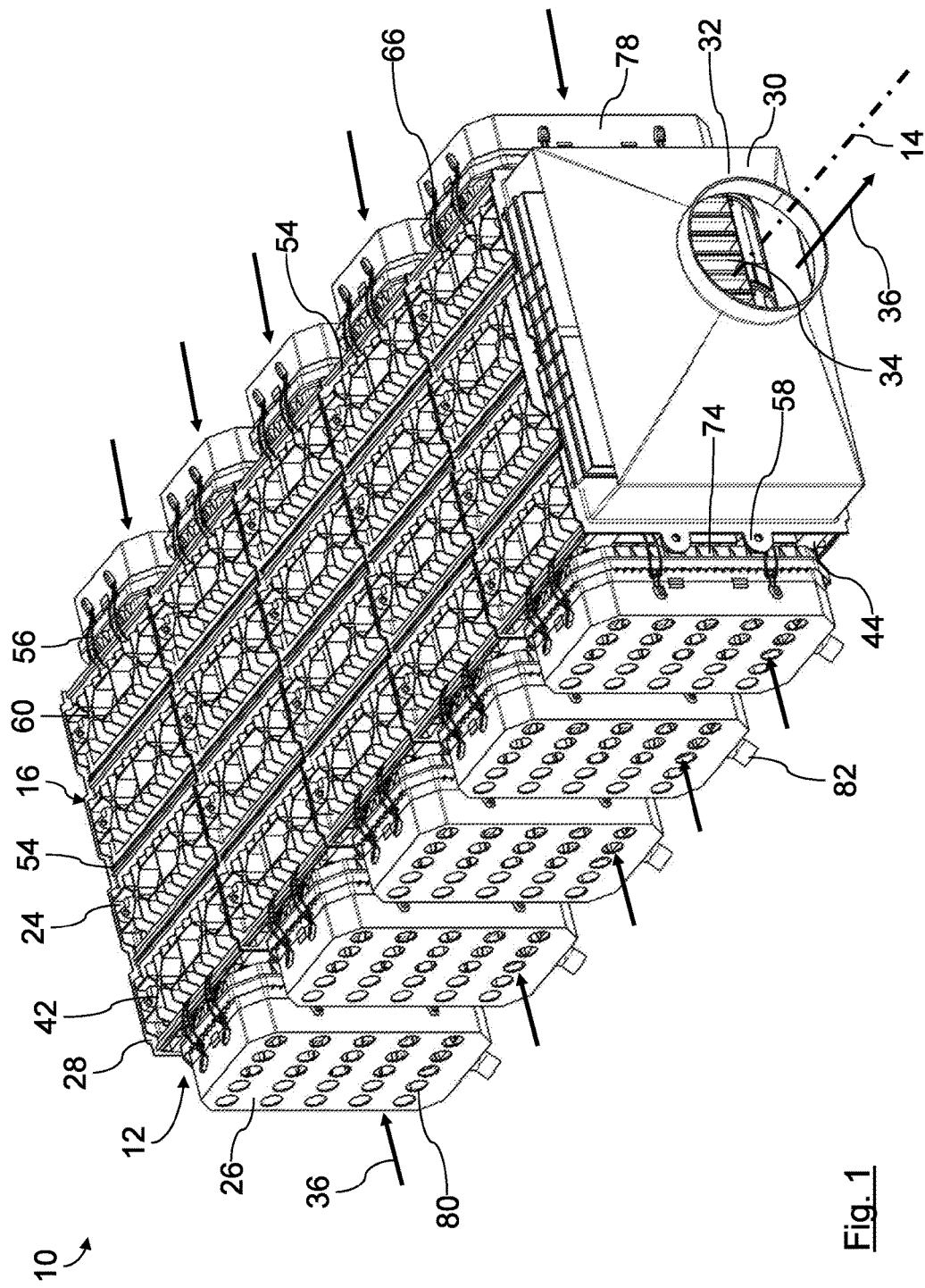

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

In FIGS. 1 to 4 a modular air filter system 10 is shown in different views. The modular air filter system 10 is intended for the cleaning of air. The modular air filter system 10 exemplary can be part of a system for heating, ventilation and air conditioning.

The modular air filter system 10 comprises five identical filter modules 12 which are connected in a row in direction of an axis 14. In terms of function the filter modules 12 are arranged parallel. Each filter module 12 comprises one housing module 16.

Each housing module 16 contains two supports 18 with one filter element 20 each on opposite sides of a duct part 22. In a normal mounting orientation, which is shown in FIG. 1, the supports 18 for the filter elements 20 are on the vertical sides of the housing modules 16.

The filter elements 20 of one filter module 12 are separated by two inner housing frame parts 24 in the middle between two outer housing frame parts 24 for supporting the filter elements 20. The inner housing frame parts 24 form the duct part 22. The common duct part 22 being used for both filter elements 20.

The filter elements 20 have a sideways opening each. One cyclone assembly 26 is connected upstream of the filter elements 20 each.

In the modular air filter system 10 the duct parts of the filter modules 12 are connected in series to the common duct for the air on the clean side of the filter elements 20. The common duct is coaxial to the axis 14. The axis 14 defines the direction of the common duct and the duct parts 22. On one face side of the modular air filter system 10, the common duct is closed by a closing end plate 28. On the opposite face side, an outlet plate 30 with an outlet 32 for the filtered air is connected to the last filter module 12. Between the outlet aperture of the duct and the outlet plate 30 a secondary filter element 34 is arranged.

The direction of air flow in the modular air filtration system 10 is in a unique way. In FIG. 1 the air flow is indicated with arrows 36. The air enters the modular air filtration system 10 through the cyclone assemblies 26 and the filter elements 20. The cleaned fluid streams through the common duct. The air flows through the secondary filter element 34 and leaves the air filter module 12 through the outlet 32.

Each housing module 16 comprises four identical housing frame parts 24 each with a support section 38 and a duct section 40. Each housing frame part 24 optional can be combined in two ways such, that it forms the duct part 22 or one support 18 for one of the filter elements 20.

Figure 2:
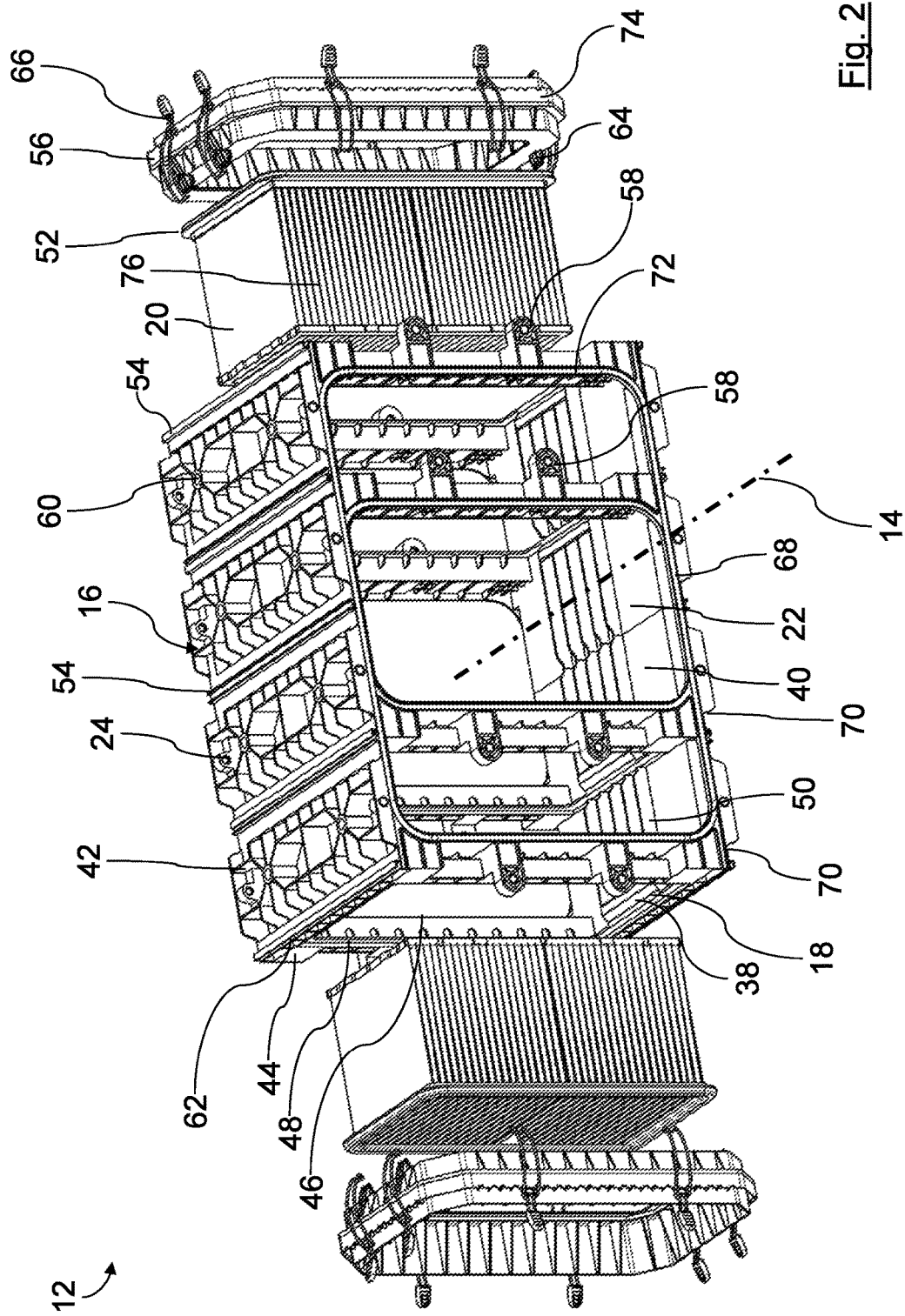
FIG. 2 an exploded view of one of the filter modules of the modular air filter system of FIG. 1.
Figure 3:
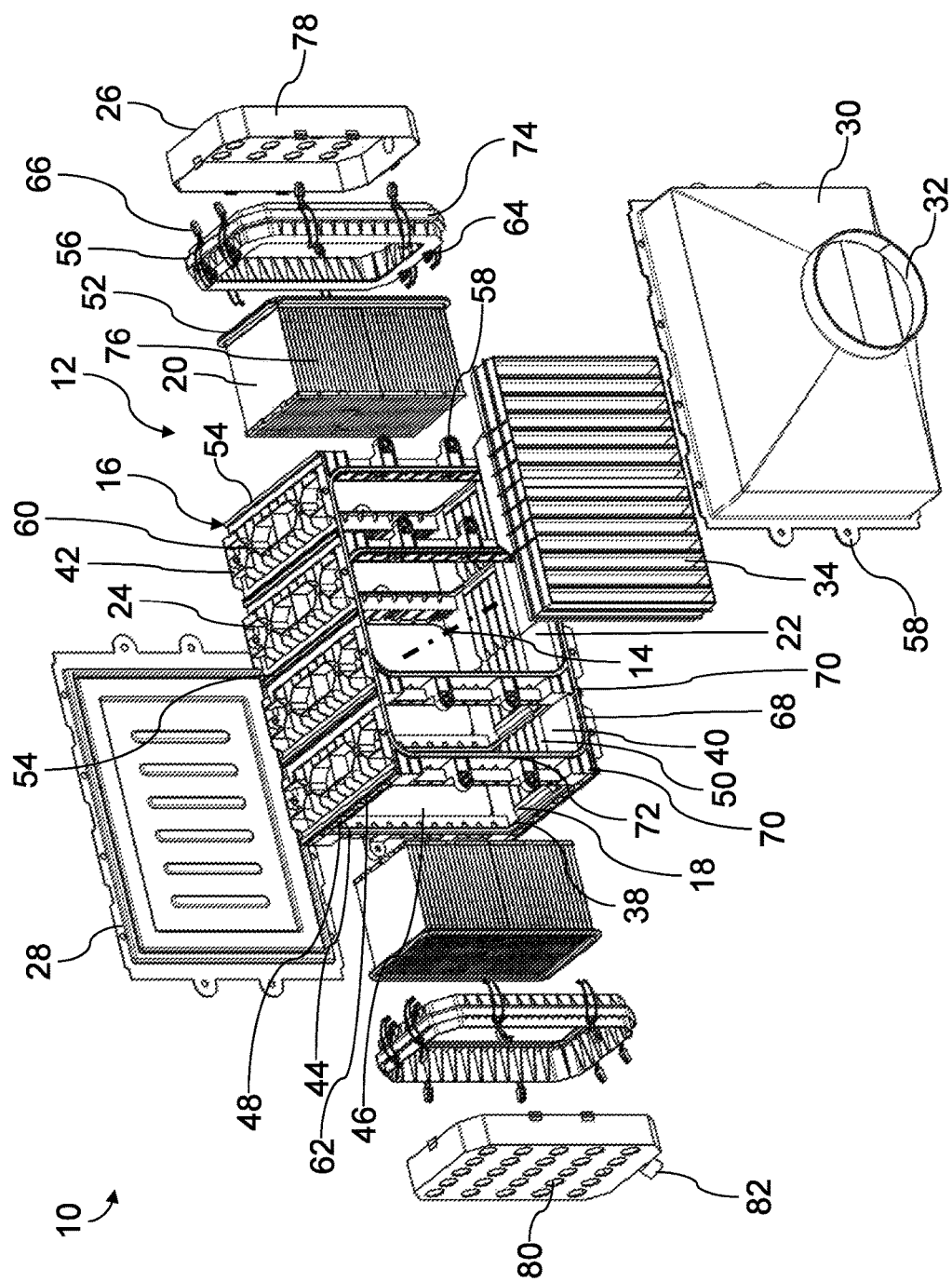
FIG. 3 an exploded view of one of the filter modules, the secondary filter element, the outlet plate and the closing end plate of the modular air filter system of FIG. 1.

Each housing module 16 has a width perpendicular to the axis 14 of approximately 1 m, a height perpendicular to the axis 14 of approximately 0.5 m and a length in direction of the axis 14 of approximately 0.5 m. In FIG. 2 the width extends approximately in horizontal direction and the height extends approximately in vertical direction. The length of the whole modular air filter system 10 with the five housing modules 16 including the outlet plate 30 is approximately 3 m.

Figure 4:
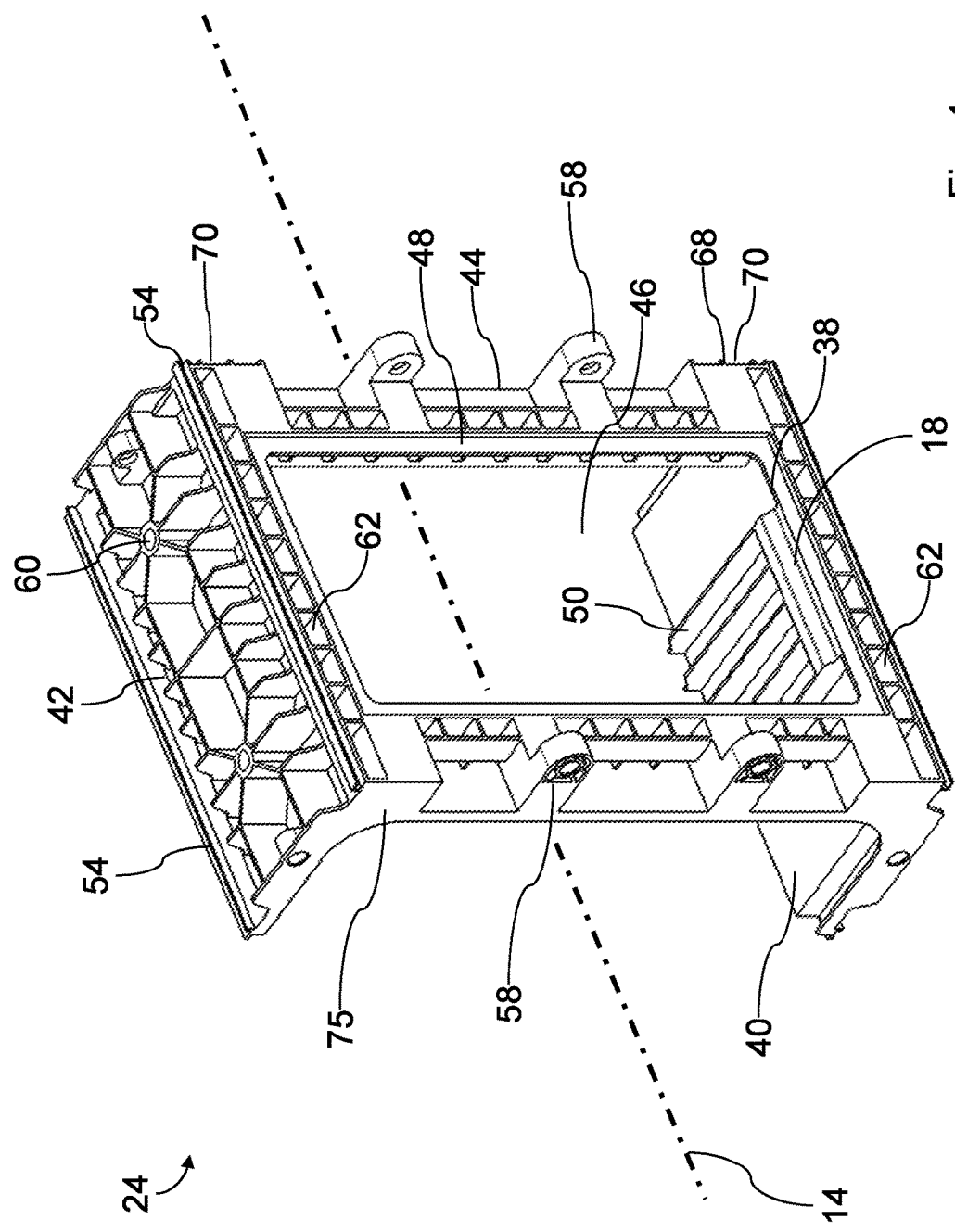
FIG. 4 a detailed view of one of the housing frame parts of the housing modules of FIGS. 1 to 3.

One of the housing frame parts 24 is shown in detail in FIG. 4. The housing frame parts 24 consist of plastic.

Each housing frame part 24 is a half shell with a rectangular shape and a U-shaped profile. It has two side sections 42 which realize the legs of the U-shape and which are connected on one side with a center section 44. The open side of the U-shaped profile can either be connected to an open side of an adjacent U-shaped housing frame part 24 or to a close side of an adjacent U-shaped housing frame part 24. The interior of the U-shaped housing frame part 24 can act as a part of the duct part 22 or as a part of the support 18 for the corresponding filter element 20. At their outsides the side sections 42 are equipped with ribs for stabilization.

Each housing frame part 24 comprises one support section 38 which is suitable for realizing one support 18 for one filter element 20. The support section 38 comprises a rectangular opening 46 in the center section 44. On the outside of the center section 44, the rectangular opening 46 is surrounded by a sealing frame 48.

The support 18 further comprises multiple supporting ribs 50 which are arranged inside the support 18 on the inside of each side section 42. The supporting ribs 50 extend in direction perpendicular to the plane of the center section 44 in direction of installing a filter element 20 if applicable. The supporting rips 50 extend to the inner surfaces of the side sections 42.

If the housing frame part 24 is used on the outside of the filter module 12, a sealing means 52 of the filter element 20 is arranged in the sealing frame 48. The supporting ribs 50 support the filter element 20. In a normal mounting orientation of the housing module 16 the filter elements 20 being supported vertically by the supporting ribs 50 against gravity. The supporting ribs 50 engage on a circumferential side of the filter element 20. The filter element 20 has polyurethane foam on its circumferential side. The supporting ribs 50 engage the entire peripheral polyurethane foam of the filter element 20.

If the housing frame part 24 is used in the center of the filter module 12, the rectangular opening 46 acts as an orifice for the filtered air. The clean side of the filter element 20 can rest on the sealing frame 48.

The duct section 40 of the housing frame part 24 is suitable for realizing a half shell of the duct part 22 of the filter module 12. The duct section 40 is formed by the side sections 42 and the center section 44. The side sections 42 and the center section 44 span a half of the duct part 22 of the filter module 12.

Each housing frame part 24 further comprises four joining sections 54 for joining with adjacent housing frame parts 24. The joining sections 54 each extend parallel to the axis 14 on the edges of the housing frame part 24. Two inner joining sections 54 are on the free edges of the side sections 42. Two outer joining sections 54 are opposite to the inner joining sections 54 in an area of transition from the side sections 42 to the center section 44.

The two inner housing frame parts 24 are connected along their two inner joining sections 54 each in the middle of the housing module 16. Each outer housing frame part 24 is connected along its inner joining sections 54 to the outer joining sections 54 of the adjacent inner housing frame part 24.

Figure 5:
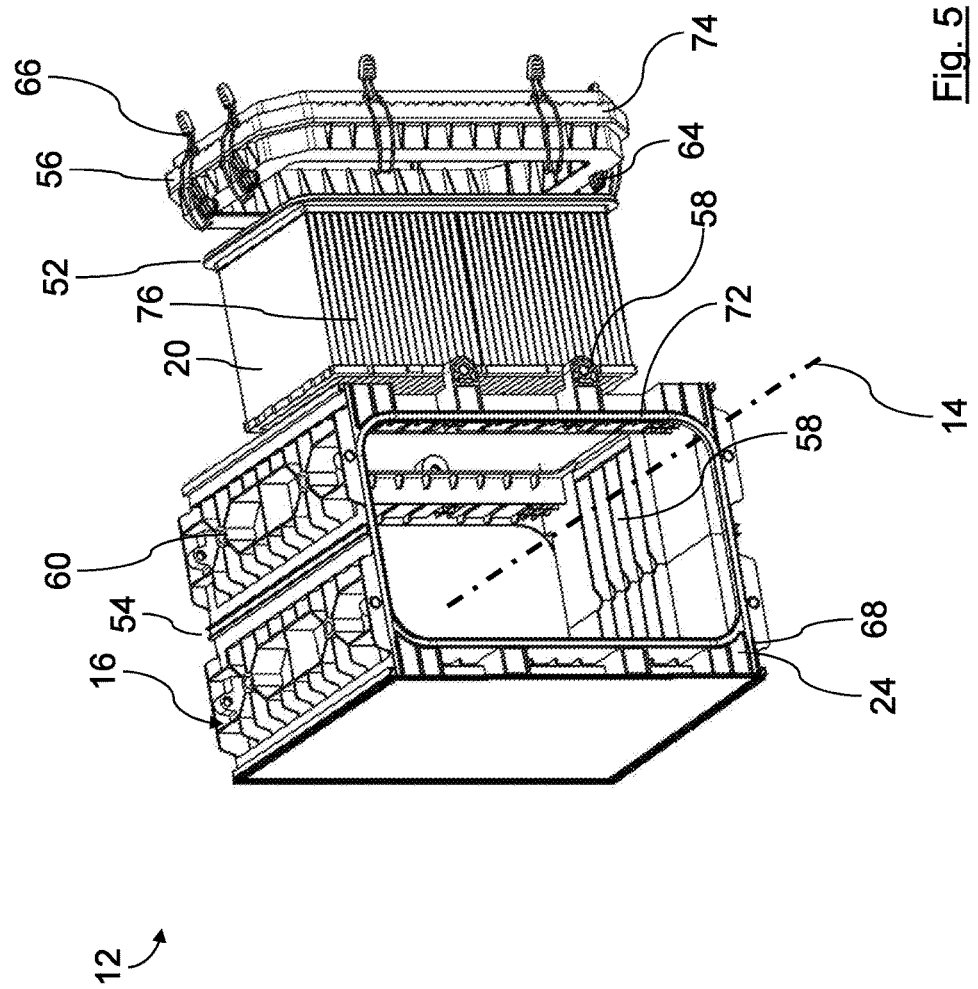
FIG. 5 an exploded view of an alternative of one of the filter modules of the modular air filter system of FIG. 1.

In the alternative embodiment of FIG. 5, only the two inner housing frame parts 24 are provided and connected along their two inner joining sections 54 each in the middle of the housing module 16.

The outside of the outer joining sections 54 of the housing frame parts 24 further are prepared for connecting a cover assembly 56 for fixing the filter element 20 and assembling the cyclone assembly 26 if applicable. In the alternative embodiment of FIG. 5, this is only provided on one side (the right side in FIG. 5) of the housing module. The outer joining section of the left frame part 24 is closed by a wall. The common duct will is established in this embodiment between the filter element and the housing walls.

Further, each housing frame part 24 comprises eight mounting sections 58 optionally for mounting adjacent housing frame parts 24 or other functional components of the modular air filter system 10.

Each housing frame part 24 provides two horizontal mounting sections 58 on each free edge of the center section 44. The free edges of the center section 44 extend between the side sections 42, in FIG. 4 in vertical direction. Each horizontal mounting section 58 comprises a tongue-shaped protrusion with a screw hole each. An axis of the screw hole extends parallel to the axis 14. As necessary, a screw can arranged in the screw hole. The screw can act in direction of the axis 14 of the duct part 22.

The housing modules 16 are stacked together axial to the axis 14 in flow direction of the duct. With the horizontal mounting sections 58 adjacent housing modules 16 are connected. With the screws of the horizontal mounting sections 58 adjacent housing modules 16 are fixed together.

Further, each housing frame part 24 provides two vertical mounting sections 60 in each side section 42. The vertical mounting sections 16 each comprise a screw hole for a screw which can act cross to the axis 14. With the vertical mounting sections 60 optionally adjacent housing modules 16 can be stacked on top of each other cross to the duct part 22. In the described embodiment, the vertical mounting sections 60 are not in use.

Furthermore, each housing frame part 24 has multiple housing frame part guiding means in form of guide slots 62 for guiding appropriate component guiding means 64 of a cover assembly 56 and for fixing appropriate lock assemblies 66 of the cover assembly 56 if required.

The guide slots 62 are in the center section 44 near the outer edges of the side sections 42 besides the joining sections 54. The guide slots 62 are placed between the joining sections 54 and the opening 46 of the center section 44. The guide slots 62 are arranged side by side in direction parallel to the axis 14. With the completed filter module 12 the guide slots 62 of the outer housing frame parts 24 are on the side of the housing module 16.

Furthermore, each housing frame part 24 comprises a sealing guide 68 on one face side. With the completed housing module 16 the sealing guides 68 of the housing frame parts 24 are put together to a continuous sealing guide for one air-sealing gasket. In the shown embodiment, the sealing guides 68 are on the face sides of the housing frame parts 24 which are facing the outlet plate 30.

The sealing guide 68 of each housing frame parts 24 extends along the edges of the two side sections 42 and the center section 44. Each sealing guide 68 has four sealing guide joining sections 70 and one sealing guide end section 72. Two inner sealing guide joining sections 70 extend along the side sections 42 and open to respective free edges of which. Two outer sealing guide joining sections 70 extend along the side sections 42 and open to respective transitions of which to the center section 44. The sealing guide end section 72 extends along the center section 44. The sealing guide end section 72 connects the two outer sealing guide joining sections 70 such, that the outer sealing guide joining sections 70 and the sealing guide end section 72 optionally can be used.

With the completed housing module 16 the inner sealing guide joining sections 70 of the two inner housing frame parts 24 are connected to each other. The outer sealing guide joining sections 70 of the inner housing frame parts 24 are connected to the inner sealing guide joining sections 70 of the outer housing frame parts 24. The outer sealing guide joining sections 70 of the outer housing frame parts 24 are not used. Instead of that, the sealing guide end sections 72 of the outer housing frame parts 24 complete the continuous sealing guide for the gasket.

The face side of each housing frame parts 24 opposite to the sealing guides 68 are formed as a part of a sealing surface 75 for the gasket of the adjacent housing frame part 24.

In each continuous sealing guide between two housing modules 16 one air-sealing gasket is placed. The gaskets are sealing the duct parts 22. The sealing arrangements with the gaskets, the sealing guides 68 of the continuous sealing guide and the sealing surfaces 75 circumscribe the air flow apertures of the adjacent duct parts 22 between the housing modules 16. The sealing arrangements project on the outside of each housing frame part 24. The gasket of the housing module 16 adjacent to the outlet plate 30 is sealing against the outlet plate 30. A gasket of the closing end plate 28 is sealing against the housing module 16 on the opposite side.

Each cover assembly 56 comprises a rectangular plastic frame 74. Six lock assemblies 66 in form of wire clamps are distributed along the radial outer circumferential sides of each cover assembly 56. Each cover assembly 56 is secured to the adjacent outer housing frame part 24 along the outer joining section 54 of which. The cover assemblies 56 each cover an inlet side of the respective filter element 20.

Each cover assembly 56 further comprises four component guiding means 64 in form of guiding projections. Two component guiding means 64 each are on opposite edges of the frame of the cover assembly 56 which are corresponding to the side sections 42 of the adjacent housing frame parts 24. The component guiding means 64 are directed toward the adjacent housing frame part 24. The component guiding means 64 cooperate with the appropriate guide slots 62 for guiding the cover assembly 56 on to the housing frame part 24 while locking the cover assembly 56.

The lock assemblies 66 of the cover assemblies 56 further act as appropriate component guiding means 64. With the guiding feature of the guide slots 62 of the adjacent housing frame part 24, the lock assemblies 66 and the guide slots 62 can be brought together. The guide slots 62 ensure that the lock assemblies 66 being locked only at an corresponding pocket on side of the housing frame part 24. The cover assemblies 56 with the lock assemblies 66 ensure proper sealing of the dirty side from the clean side of the installed filter element 20.

The filter elements 20 are formed identical. Each filter element 20 has a rectangular shape.

The filter elements 20 each have a bellow of pleated filter medium 76. The bellows have an rectangular shape each. The depth of the pleats of the filter medium 76 in flow direction of the air through the filter element 20 is large compared to the extension of the filter element 20 perpendicular to the flow direction. The flow direction of the air through the filter element 20 exemplary is perpendicular to the axis 14.

The sealing means 52 of the filter elements 20 are for sealing the clean side from the dirt side when the filter element 20 is built in the support 18 of the housing module 16.

The sealing means 52 consist of polyurethane (PU) foam. The sealing means 52 surround the inlet sides of the filter elements 20.

Each filter element 20 enables an air flow rate of approximately 50 $m^3$/min. So, with each filter module 12 an air flow rate of approximately 100 $m^3$/min can be enabled. With the complete air filter module 12 a total air flow rate of approximately 500 $m^3$/min can be realized. All filter elements 20 of the air filter module 12 are acting parallel in terms of function.

The modular air filter system 10 is realized in three stages. The cyclone assemblies 26 realize the first stage, the filter elements 20 realize the second stage and the secondary filter element 34 realizes the third stage.

Each filter module 12 is provided with two cyclone assemblies 26 for pre-separation of dust particles. The cyclone assemblies 26 are pre-connected to one of the filter elements 20 by use of the respective cover assembly 56 and lock assemblies 66 of which. With the cyclone assemblies 26, the dust particles can be removed before the air reaches the adjacent filter element 20.

Each cyclone assembly 26 is made up of a cyclone frame 78. The cyclone frame 78 is provided with slots in which 25 cyclone cells 80 for pre-separation are fixed. A dust dump valve 82 for dust discharge leads through the bottom of the cyclone frame 78.

The secondary filter element 34 is a flat rectangular filter element 20. It is placed upstream of the outlet plate 30 between the outlet plate 30 and the last filter module 12.

The outlet plate 30 is rectangular funnel shaped. The outlet plate 30 comprises the air outlet 32 of the modular air filter system 10.

The outlet plate 30 and the closing end plate 28 each have four horizontal mounting sections 58 which are suitable for the four responsible mounting sections 58 of the housing frame parts 24. With the horizontal mounting sections 58, the outlet plate 30 and the closing end plate 28 each are fixed to the adjacent housing module 16.

The filter elements 20, the cyclone assemblies 26, the secondary filter element 34, the cover assemblies 56, the outlet plate 30 and the closing end plate 28 are functional components of the module air filter system 10 each.

The embodiments shown in FIGS. 6 to 24 describe separate and alternative embodiments to the embodiments shown in FIGS. 1 to 5 and described above. However, the one skilled in the art would consider advantageous features of the embodiments described in FIGS. 6 to 24 for modifications of the embodiments described with reference to FIGS. 1 to 5.

Figure 6:
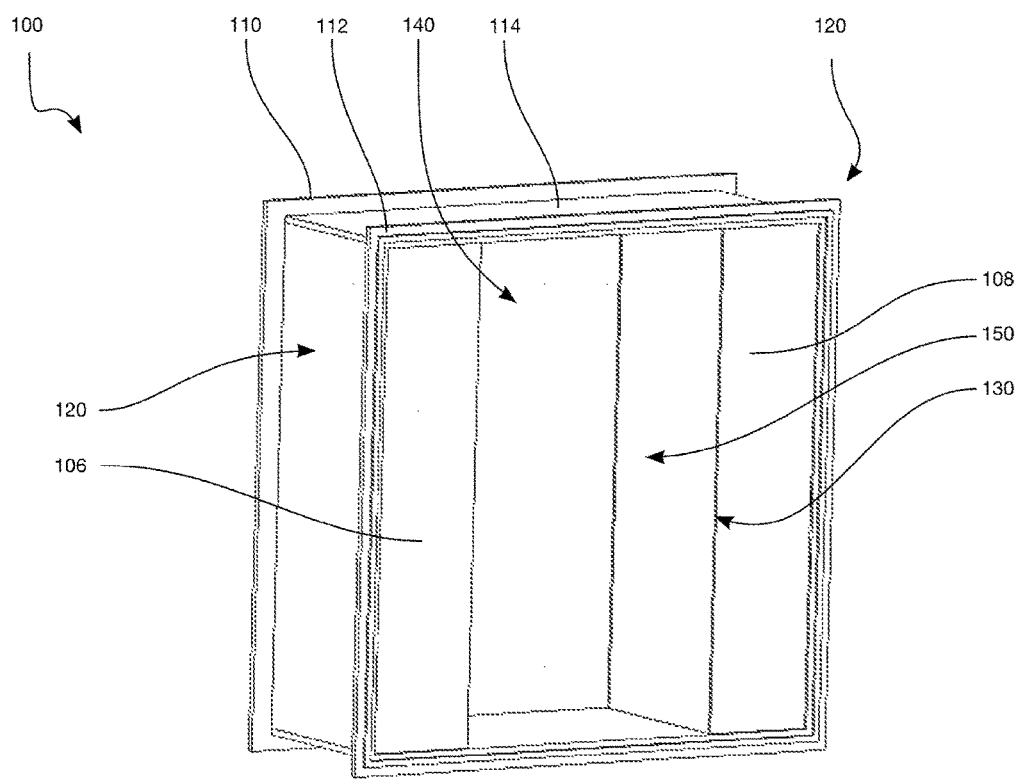
FIG. 6 shows a filter module according to the invention with box-shaped filter media, FIG. 7 a filter module according to the invention with box-shaped filter media and a flow channel that is longer compared to the embodiment of FIG. 6, FIG. 8 an inventive embodiment of a filter module with a cylindrical filter medium, FIG. 9 an inventive embodiment of a filter module with substantially box-shaped filter media with a molded-in flow channel, FIG. 10 an inventive embodiment of a filter module according to FIG. 9 with a shorter flow channel, FIG. 11 a first embodiment of a connecting element for a system according to the invention, FIG. 12 another embodiment of a connecting element for a system according to the invention, FIG. 13 a detailed view of the embodiment of FIG. 12, FIG. 14 an embodiment of a seal for a system according to the invention, FIG. 15 the seal of FIG. 14 in an enlarged schematic sectional view, FIG. 16 a configuration of a system according to the invention with two filter modules, one adapter module and one end element, FIG. 17 a first view of another configuration of a system according to the invention with two flow channels and, for each flow channel, one connection module, one end element and four filter modules, FIG. 18 another view of the inventive system of FIG. 17, FIG. 19 another configuration of an inventive system with pre-separator modules, FIG. 20 another partial configuration of an inventive system with a connection module, four filter modules and three intermediate modules, FIG. 21 another view of the partial configuration of FIG. 20, FIG. 22 another configuration of the system according to the invention with a combined connecting/branching module, eight filter modules, six intermediate modules and two end elements, FIG. 23 another configuration of the system according to the invention with a branching module that offers a total of five possible connections for filter modules, FIG. 24 another view of the configuration of FIG. 23.

FIG. 6 shows an embodiment of a filter module 100 according to the invention for a system for filtering large airflow volumes. The filter module 100 has two opposing box-shaped filter elements 106, 108. The filter elements 106, 108 can be embodied so as to be replaceable. In the case of replaceable filter elements 106, 108, the filter module, particularly the frame 110, 112, has two opposing filter element receiving interfaces arranged particularly in the area of the inflow regions 120. The rectangular design of the filter modules enables very good utilization of space. In general, the engines or applications for which such filters can be considered also usually have a rectangular basic structure. The filter elements 106, 108 are fastened in a frame consisting of two parts 110, 112. The frame can also be embodied in a single piece or divided into a larger number of parts. Surfaces of the filter elements 106, 108 opposing each other on the outside form raw-side inflow regions 120. On outer areas of the filter module 100 in which there are no inflow regions of the filter element 106, 108, are closed by flat frame element 114. The closed sides make it possible to mount the combined filter modules on the closed side. This facilitates and simplifies assembly and the fastening systems. In addition, several filter systems, each consisting of several modules, can thus be stacked in a space-saving manner. Moreover, it is possible to occupy the side surfaces of individual filter modules differently depending on the application. For example, a closed side can be outfitted with a filter surface.

During the production of the filter module 100, the frame parts 110, 112 can be used as end plates for the adhering or pouring of the filter media 106, 108. The filter media 106, 108 leave a flow channel 150 open in the middle of the filter module 100. The flow channel 150 has on one side an outer clean-side outflow opening 130 and, on the opposing side, an outer clean-side inflow opening 140. The filter media 106, 108 have an outer raw-side inflow region 120 on their outer sides. As will readily be understood, outflow opening and inflow opening can also be reversed depending on the installed position of the filter module. This assumes that the connecting means between filter modules 100 are designed accordingly.

Figure 7:
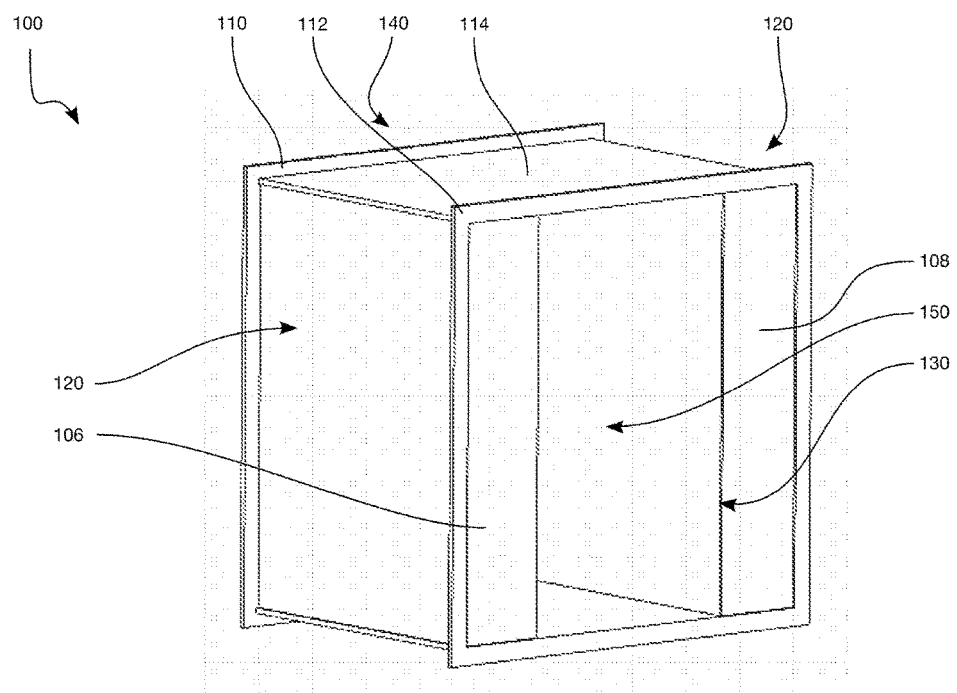

FIG. 2 shows a filter module comparable to that shown in FIG. 6. In FIG. 7 and all of the following figures, same reference symbols are used for same or comparable features. Unlike the filter module of FIG. 6, the filter module 100 of FIG. 7 has a longer flow channel 150. By means of filter modules which differ in length or frame size, different increments can be produced, thus cooperating to produce nearly any overall length or dimensions.

Figure 8:
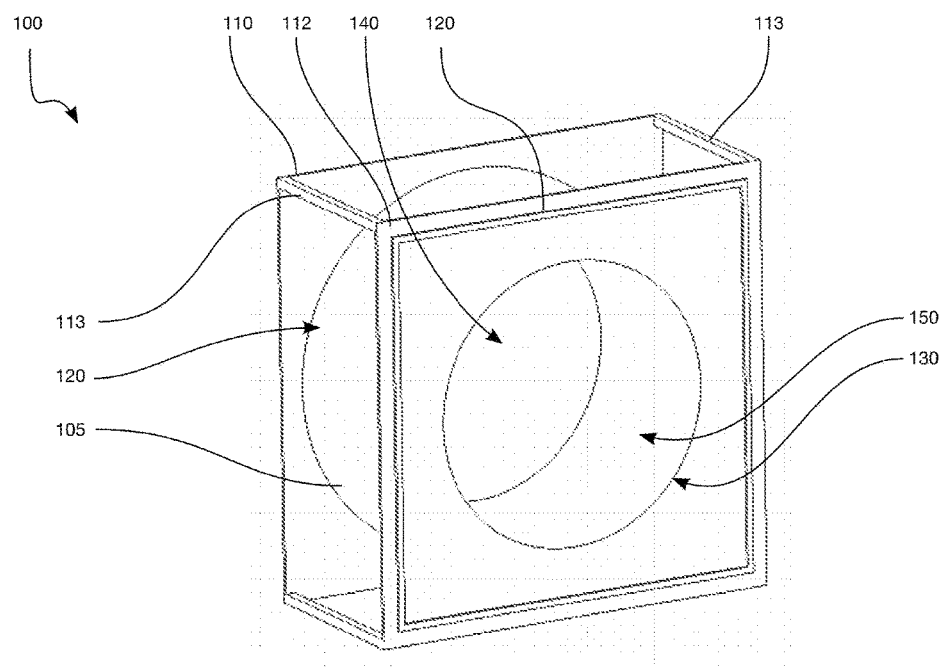

FIG. 8 shows a filter module according to the invention 100. Unlike the filter elements 106, 108 of FIGS. 6 and 7, the filter module 100 has a filter element 105 that is substantially cylindrical. This results in a substantially cylindrical outer raw-side inflow region 100 as well as a commensurately cylindrical flow channel 150. Moreover, the two frame parts 110, 112 are interconnected by means of bars 113 in order to increase the stability of the filter module.

Figure 9:
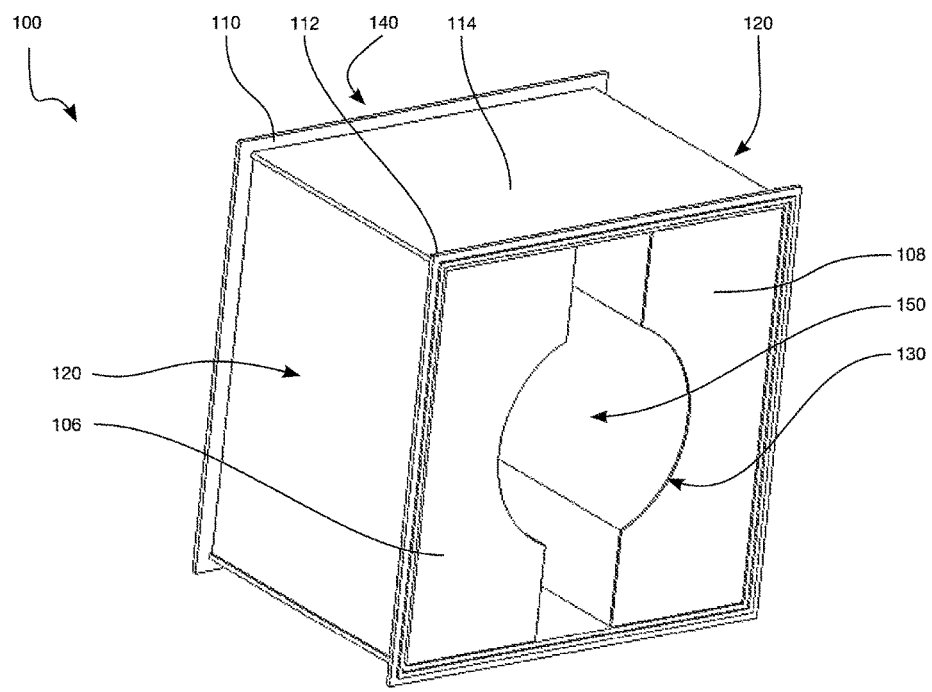

FIG. 9 shows a filter module according to the invention 100. The filter elements 106, 108 are substantially box-shaped here. A flow channel 150 is molded into the sides of the filter elements 106, 108 opposing each other on the inside. This results in maximum exploitation of the installation space available for filter media with a simultaneously advantageous formation of a flow channel 150.

Figure 10:
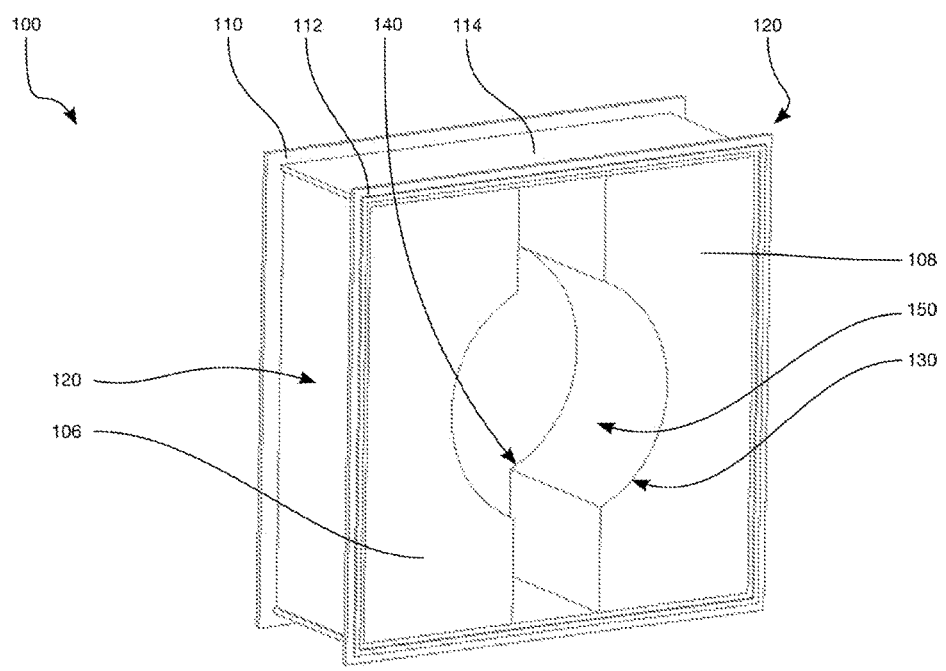

FIG. 10 shows a filter module 100 comparable to that shown in FIG. 9 with a shorter flow channel 150.

Figure 11:
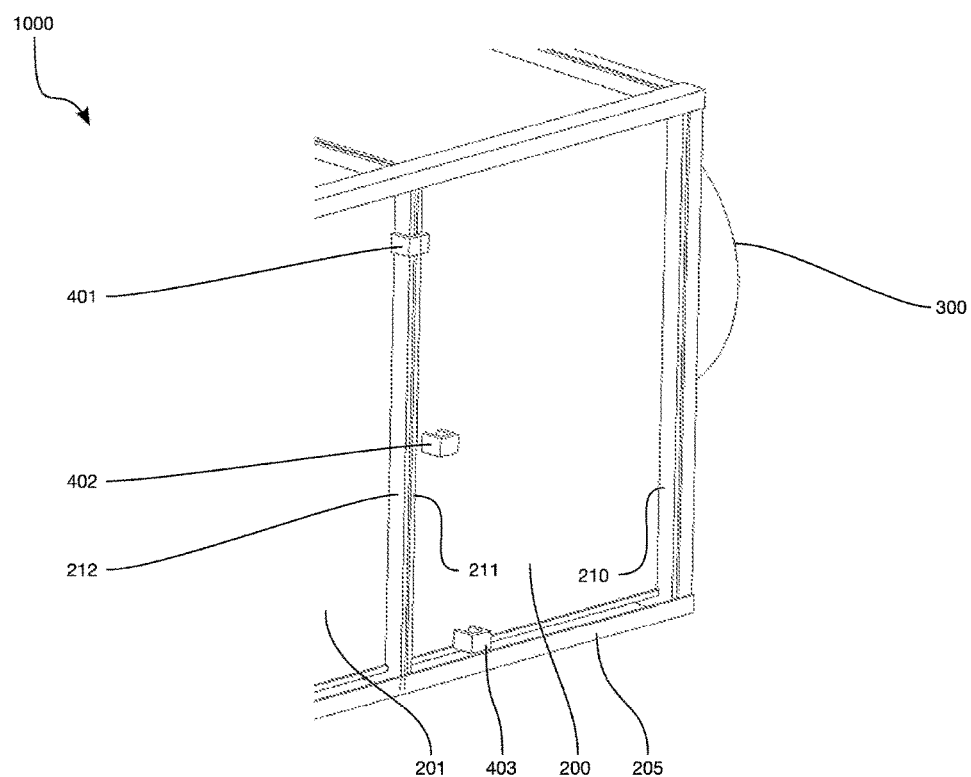

FIG. 11 shows a first embodiment of a connecting element for a system 1000 according to the invention. The system 1000 has a first filter module 200, a second filter module 201 and a supporting frame 205. The filter modules 200, 201 are guided on the supporting frame 205.

A connection module 300 is provided on the supporting frame 205 for connecting the system 1000 to an intake channel (not shown), for example of an engine. On its side facing toward the connection module 300, the filter module 200 adjacent to the connection module 300 has a frame part 210. On the opposing side, it has a frame part 211. The filter module 201 adjacent to the first filter module 200 is shown only partially; in particular, the frame part 212 facing toward the first filter module 200 is visible. The frame part 211 of the first filter element facing away from the connection module 300 and the frame part 212 of the second filter module 201 facing toward the connection module 300 abut against each other. A connecting means 401, 402, 403 is provided to engage in the manner of a clamp around the mutually opposing frame parts 211, 212, thus fixing them against each other.

Figure 12:
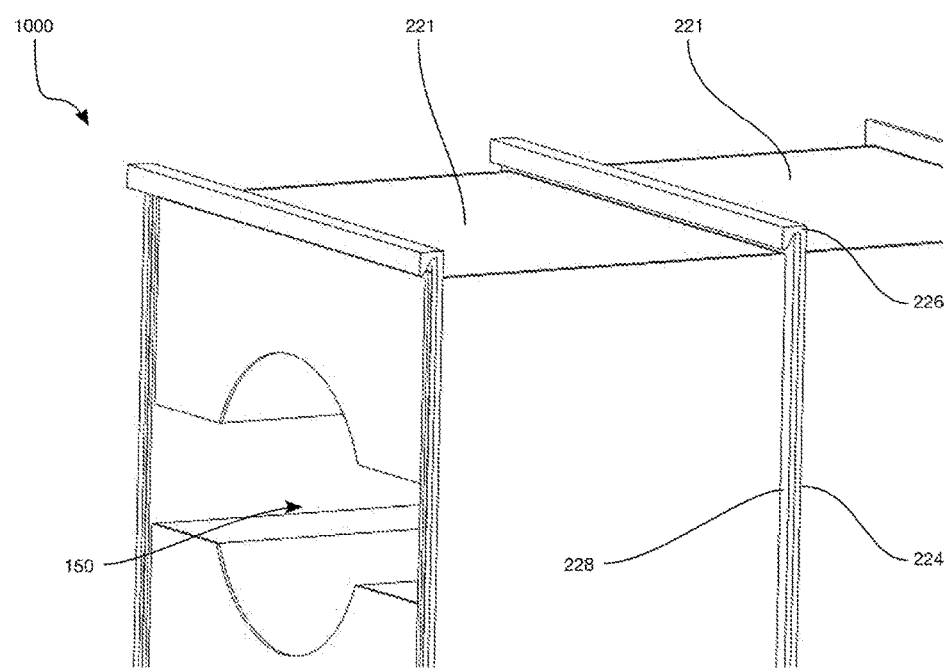

FIG. 12 shows another embodiment of a connecting element for a system 100 according to the invention with two filter modules 220, 221. The frame parts are structured differently in the filter modules 220, 221. A first frame part 224 of the box-shaped filter module 220 has a U-shaped frame profile 226 on an edge of the box. The opening of the U-shaped frame profile 226 is oriented in the direction of the middle of the filter, i.e., in the direction of the flow channel 150. The freely projecting leg of the frame profile 226 is wedge-shaped, whereby the clear width of the profile 226 decreases toward the interior of the profile. This is shown more clearly in FIG. 13.

Figure 13:
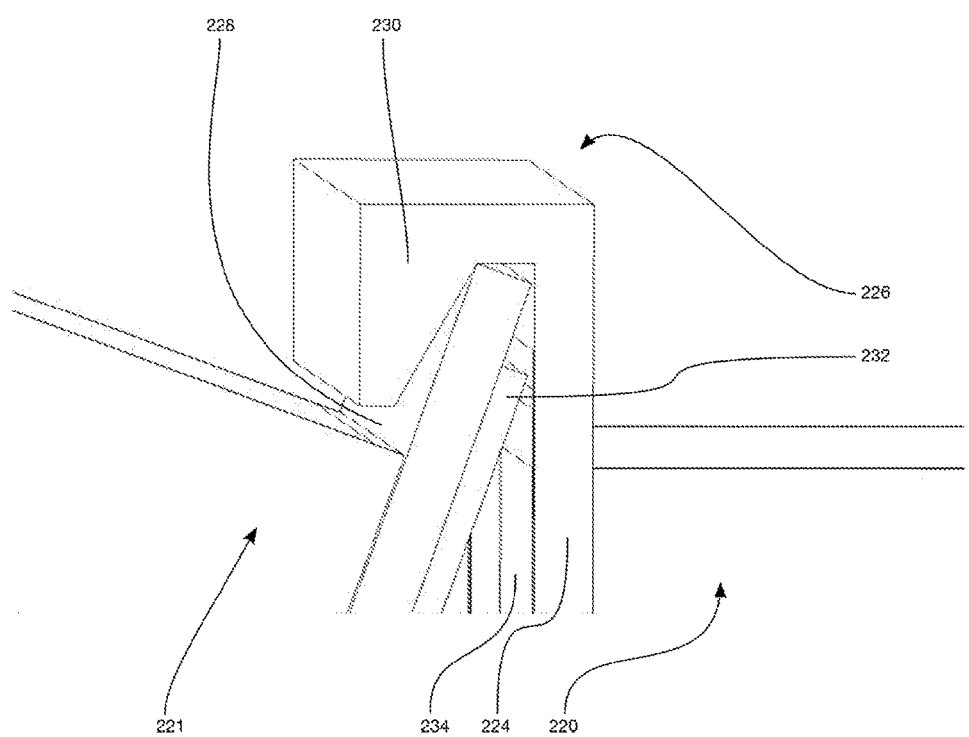

FIG. 13 shows an enlarged sectional representation of FIG. 12 and shows the two filter modules 220, 221 in a position that is assumed before connection of the two filter modules 220, 221. The frame part 228 of the filter module 221 is placed in the U-shaped frame profile 226 of the frame part 224 of the filter module 220. The wedge-shaped design of the profile leg 230 projecting from the frame part 224 supports the insertion of the frame part 228 into the U-shaped frame profile 226. Seal elements 232 mounted on the frame part 228 are pressed into a corresponding seal groove 234 of the frame part 224 provided in the opposing surface, thus ensuring an airtight connection of the two filter modules 220, 221.

Figure 14:
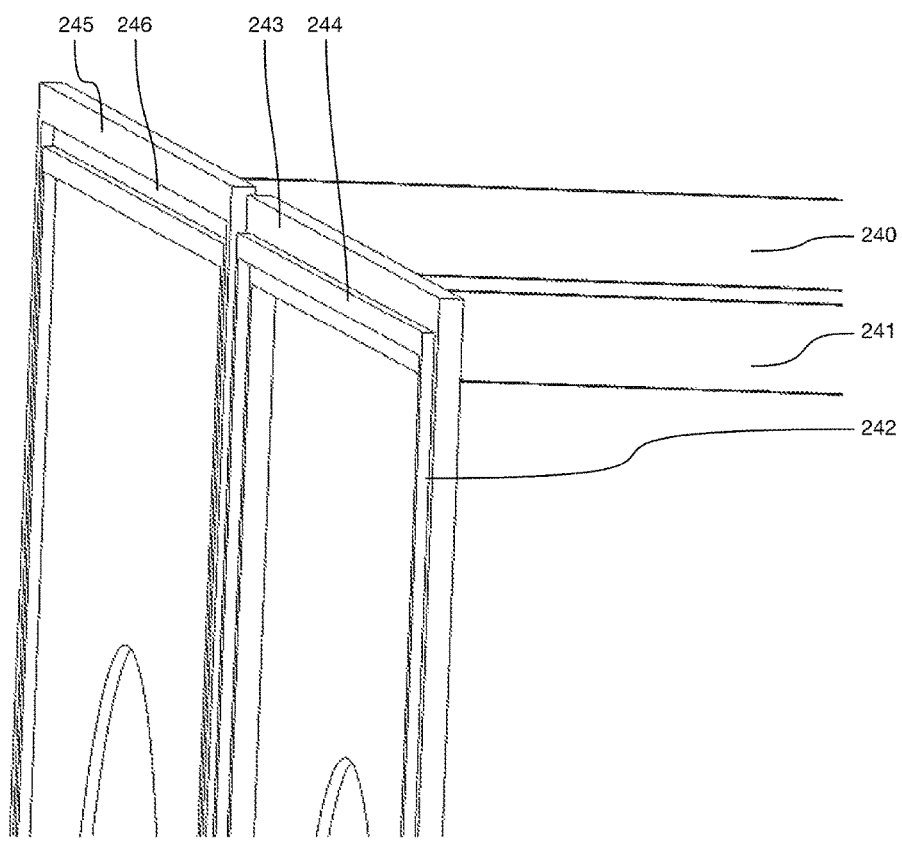

FIG. 14 shows the arrangement of seal and seal groove in two filter modules 240, 241 arranged next to each other. The filter module 241 has a circumferential seal 242. The seal 242 is wider at one of the edges of the box-shaped filter module 241—as a seal bar 244. This seal bar 244 engages in a commensurately embodied seal groove 246 of the filter module 240. Seal groove 246 and seal bar 244 thus cooperate in such a way that a high sealing effect is produced upon their engagement with each other. At the same time, slipping of the filter modules 240, 241 with respect to each other is effectively prevented. Particularly in cooperation with the U-shaped frame profile described in FIG. 8, a low-tolerance connection of two modules can be produced in this way. Moreover, in the region of seal groove 246 and seal bar 244, the frame parts 243, 245 can be interconnected by means of clamp-like connecting means.

Figure 15:
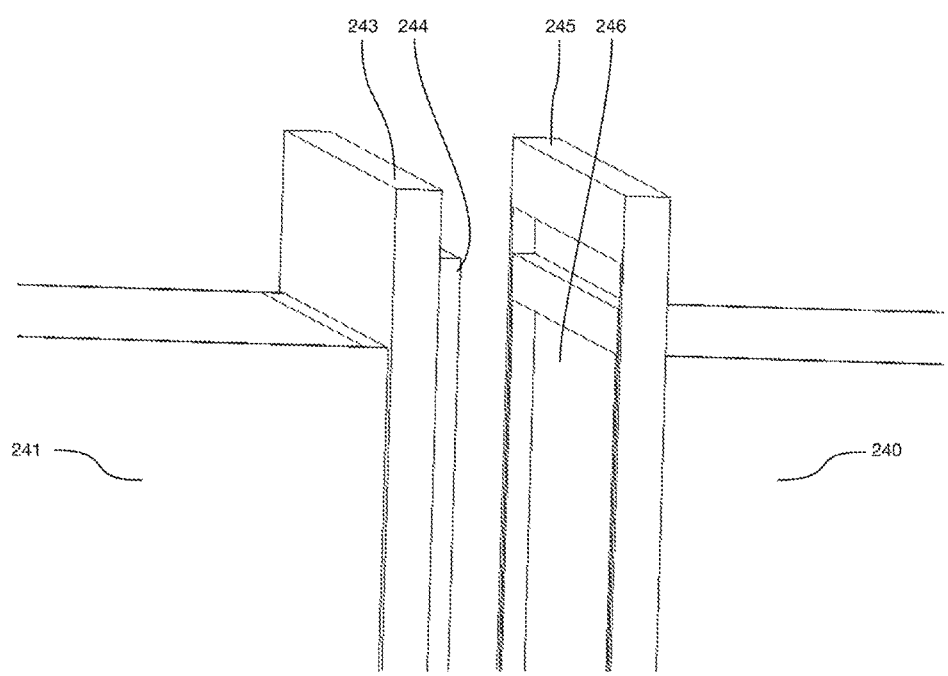

FIG. 15 illustrates the position and arrangement of seal groove 246 and seal bar 244 in an enlarged sectional drawing with opposing filter modules 240, 241.

Figure 16:
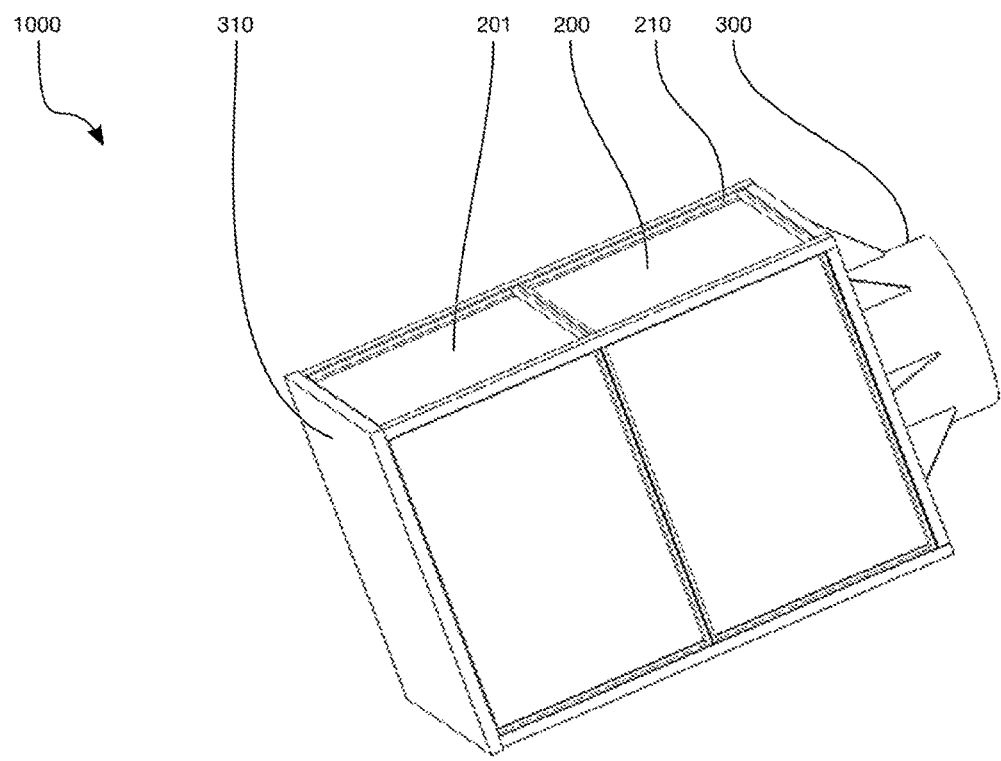

FIG. 16 shows a configuration of a system 1000 according to the invention. The system has two filter modules 200, 201 that are interconnected. The outflow opening of the first module 200 is connected to an adapter module 300. The inflow opening of the second filter module 201 is connected to an end element 310. A supporting frame 210 guides the filter modules 200, 201 and imparts additional stability to the overall system.

Figure 17:
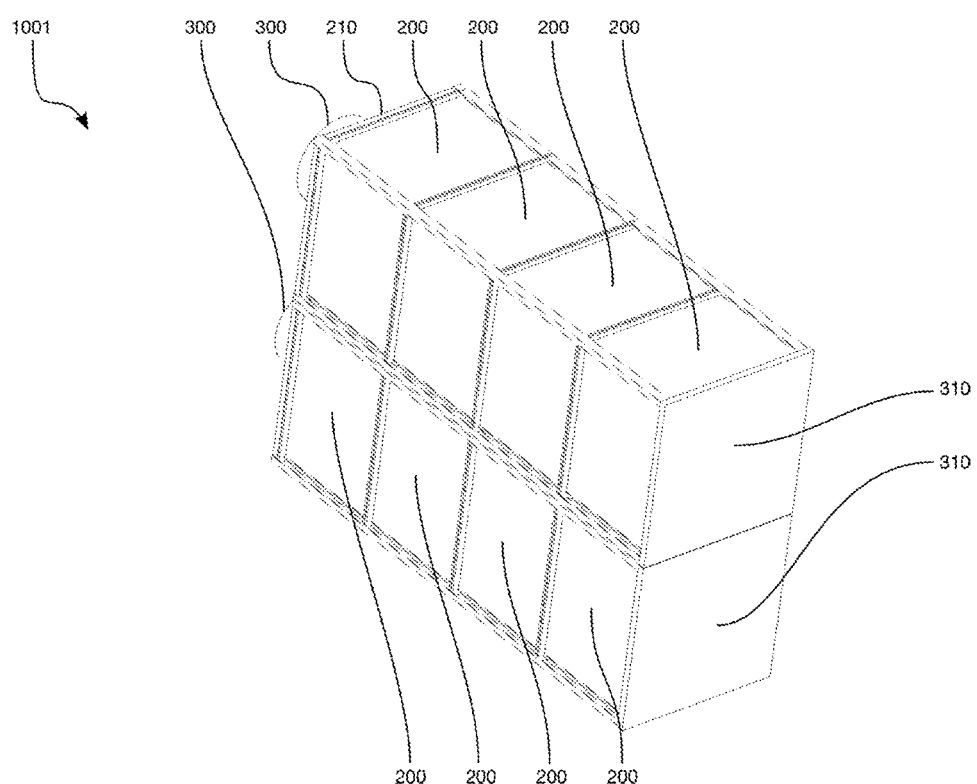
Figure 18:
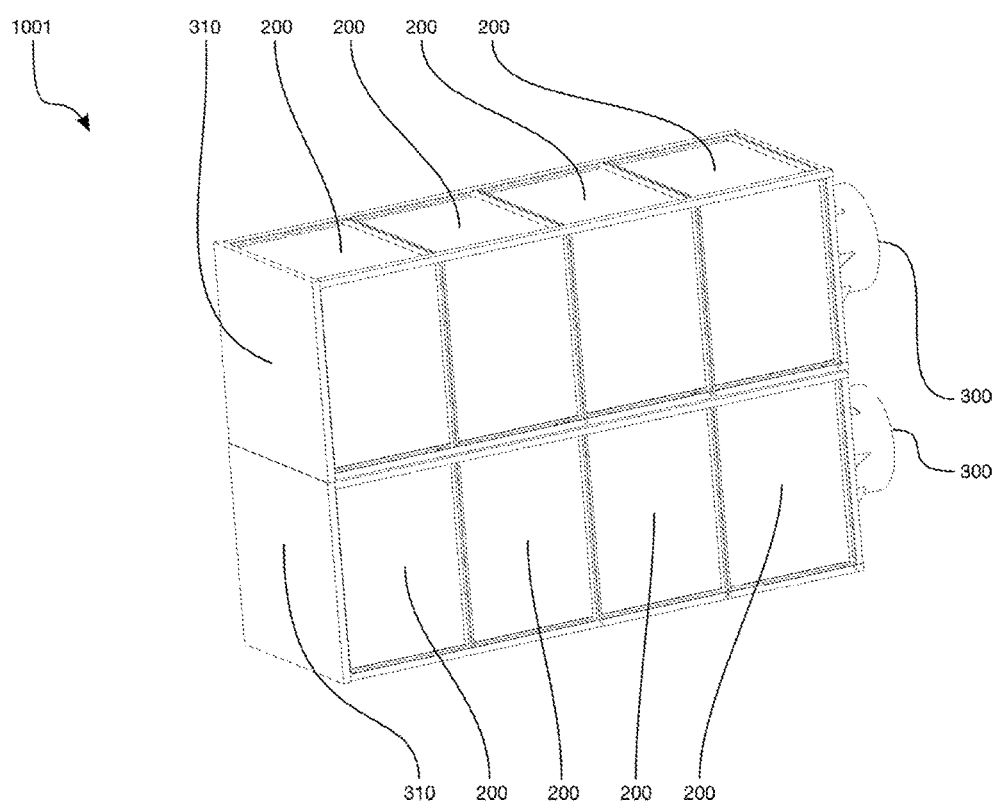

FIGS. 17 and 18 show a system 1001 according to the invention. The system 1001 has two separate flow channels. Accordingly, the system 1001 has two connection modules 300, a total of eight filter modules 200 and two end elements 310. A corresponding supporting frame 211, which can also have rails, is provided.

Figure 19:
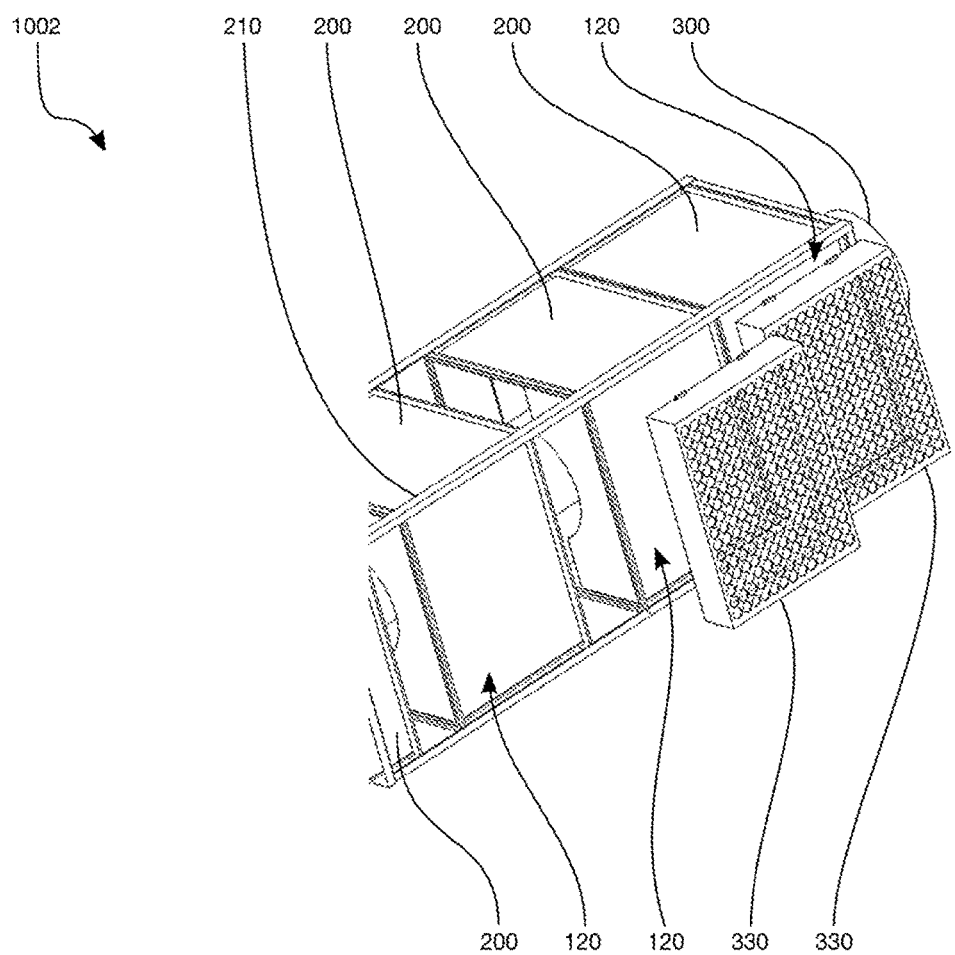

FIG. 19 shows a system 1002 according to the invention. The combination shown in FIG. 14 has a supporting frame rail system 210 in which four filter modules 200 can be received. A connection module 300 is also shown. Pre-separator modules 330 can be forward-spaced at the inflow regions 120 and fastened to the frame of the module or to the rail system 210. Standardized pre-separator modules can be used here. This enables easy conversion from single-stage to two-stage filter.

Figure 20:
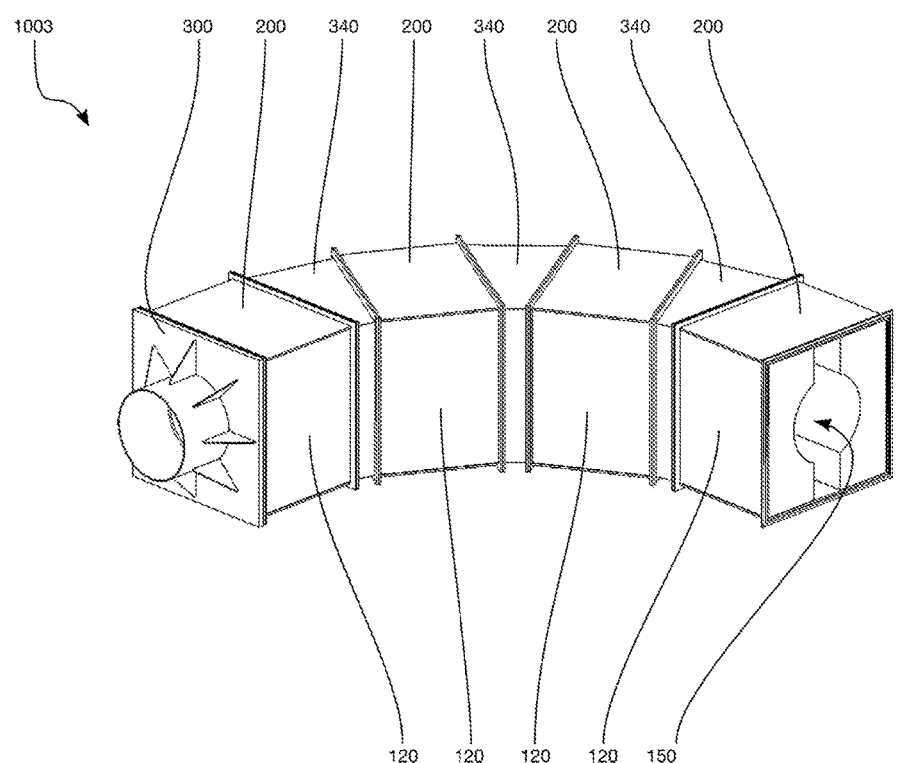
Figure 21:
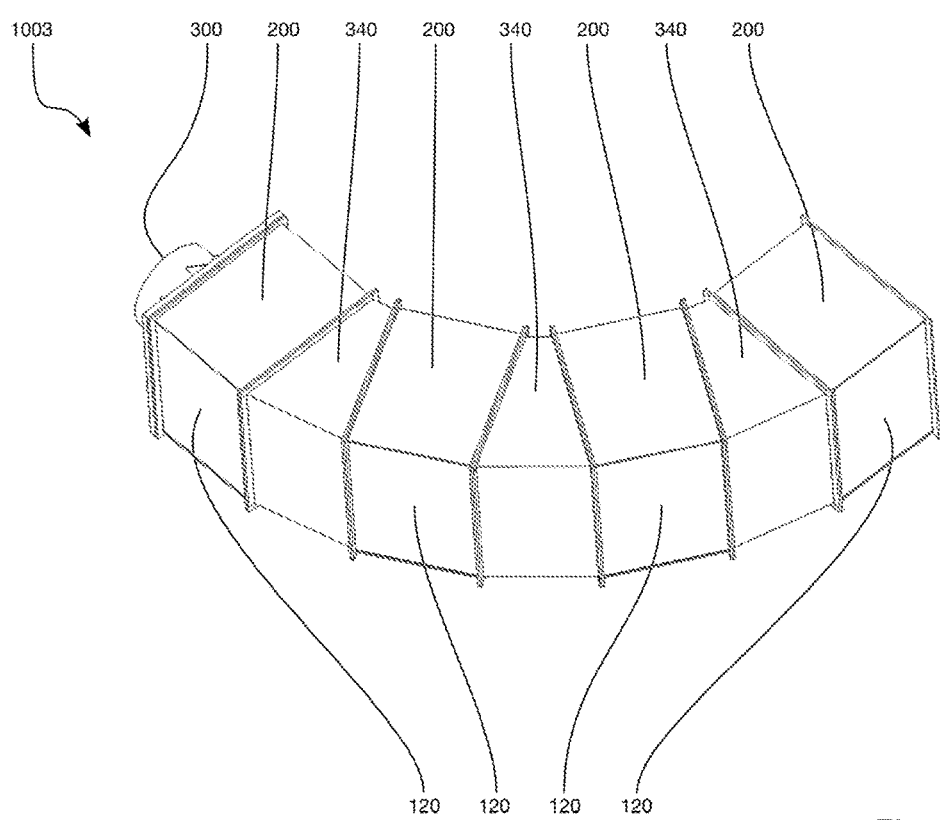

FIGS. 20 and 21 show a system 1003 according to the invention. The system 1003 comprises four filter modules 200, one connection module 300, as well as intermediate modules 340 arranged between the filter modules. For better illustration, one end element 310 is not shown. The intermediate modules 340 have a wedge-shaped basic shape and thus enable a change in direction of the flow channel 150 away from a purely linear alignment. In the case of diametrically opposed use of the wedge-shaped intermediate modules 340, an offsetting of the flow channel 150 is possible. This enables substantially better utilization of the existing installation space.

Figure 22:
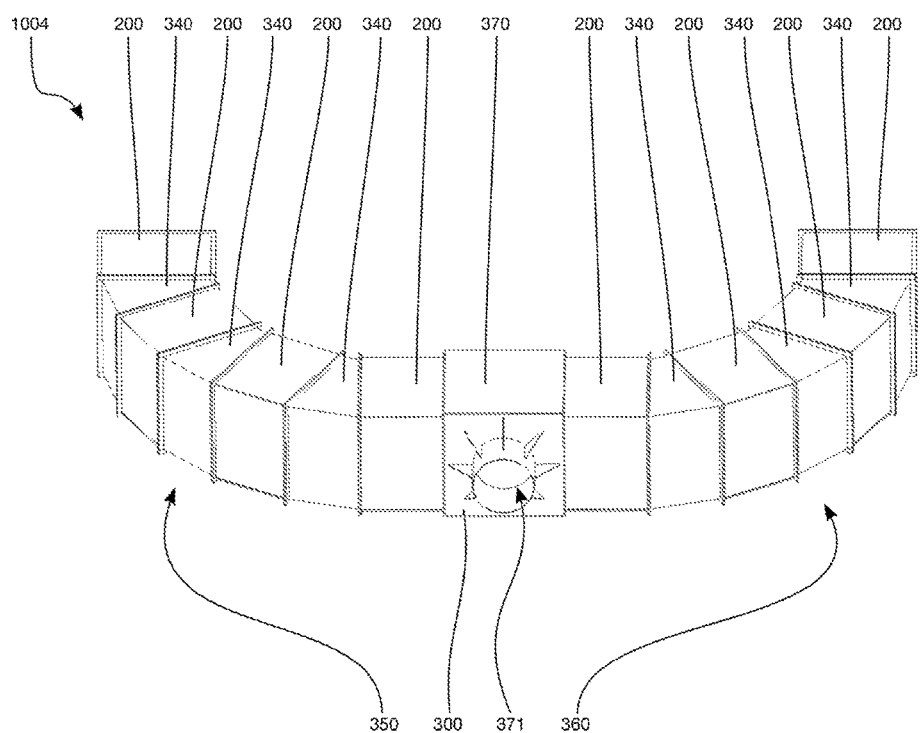

FIG. 22 shows a system 1004 according to the invention. Unlike the system 1004 of FIGS. 20 and 21, the system 1004 has two suction lines 350, 360. A first suction line 350 and a second suction line 360 branch at a branching module 370. The branching module 370 has an outflow opening 371 and two inflow opening (not shown). A connection module 300 is mounted on the branching module 370. By means of the branching module 370, it is possible to structure the geometry of the system 1004 in such a way, for example, that the connection module 300 can be positioned anywhere within a suction line.

Figure 23:
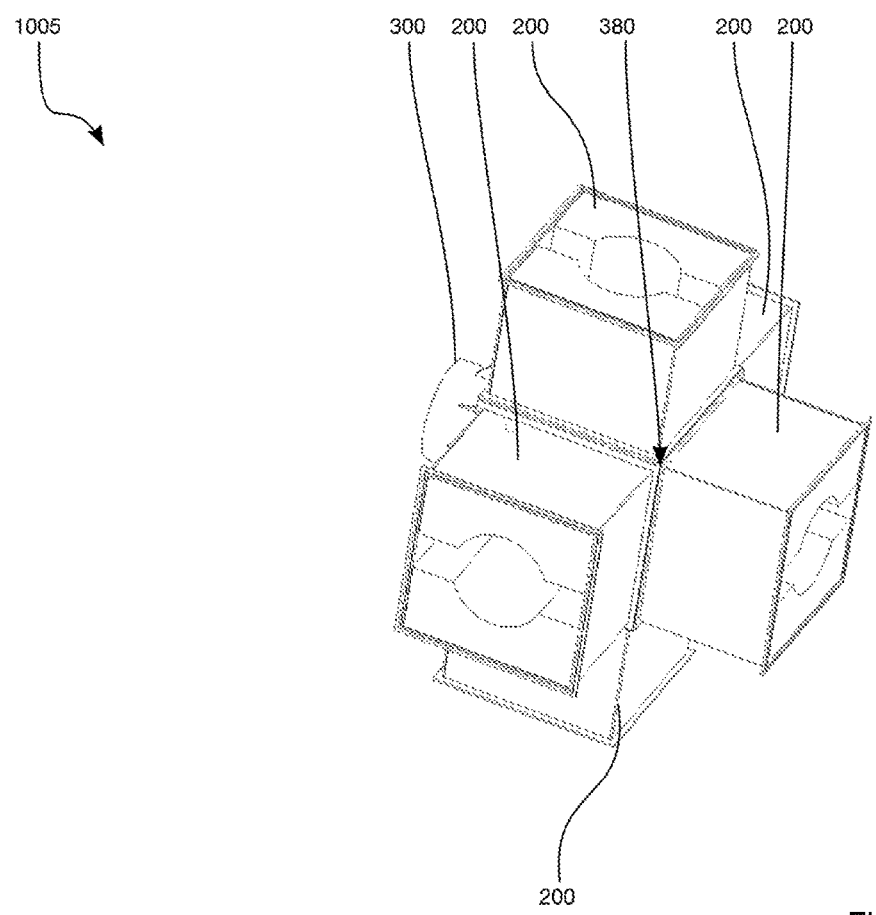
Figure 24:
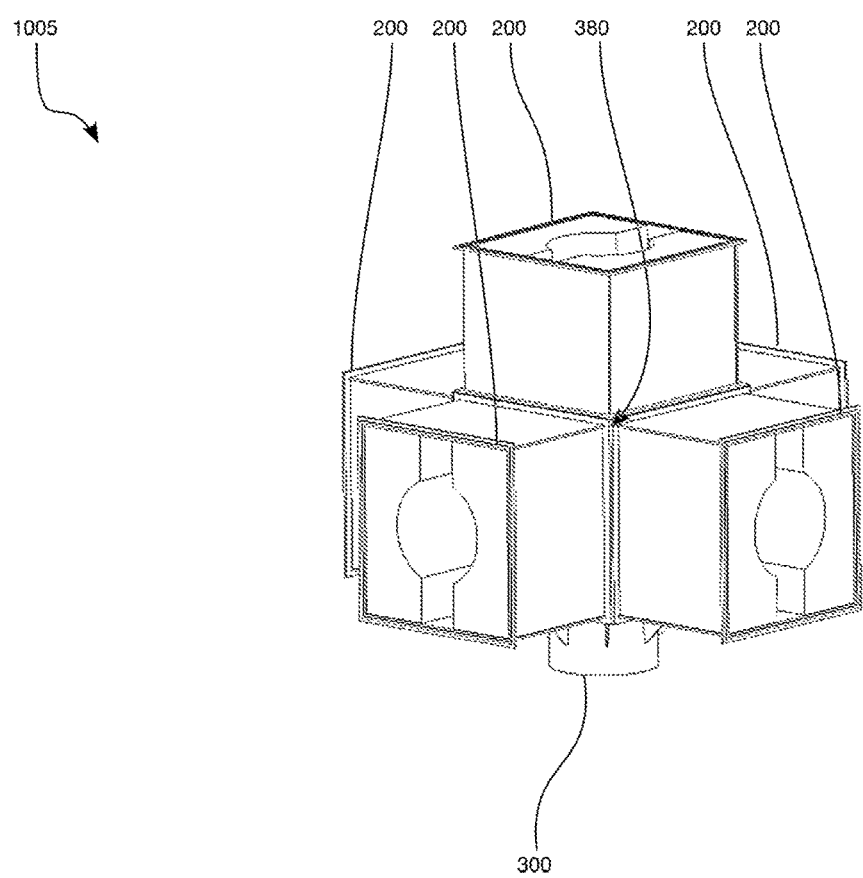

FIGS. 23 and 24 illustrate other configuration of a system 1005 according to the invention with a branching module 380 which offers a total of five possible connections for filter modules. The branching module 380 has five inflow openings, on each of which one filter module 200 is mounted in the present configuration. An end module 300 is mounted at its outflow opening.

What is claimed is:

1. A modular filter system for cleaning of gaseous fluid, comprising:
   at least one housing module with at least one support in which at least one filter element is arranged, the at least one filter element having a dirty side and a clean side; and
   at least one duct for the gaseous fluid arranged on the clean side of the at least one filter element;
   wherein the at least one housing module includes
      at least one housing frame part;
   wherein said at least one housing frame part includes
      at least one duct section, the at least one duct section forming the at least one duct or duct part;
   wherein the at least one housing frame part can optionally be applied in the housing module such, that the at least one support section of the at least one housing frame part is be part of or forms at least one support and/or the at least one duct section is a part of or forms at least one duct;
   wherein the at least one housing frame part is a rectangular half shell having a U-shaped profile, each housing frame part of the at least one housing frame part having:
   a center section of the housing frame part;
   a first side section forming a first leg of the U-shaped profile, the first leg having an end connected to an first end of end of the center section;
   a second side section forming a second leg of the U-shaped profile, the second leg connected at an end to an opposite second end of the center section, the center section spacing the first leg apart from the second leg;
   wherein the center section together with the first section and the second section form the U-shaped profile;
   wherein a side of the housing frame part opposite the center section is open such that the first and second legs are connected to the housing frame part at only one end of each leg, an opposite end of the first and second legs being free;
   wherein the housing frame part comprises at least one support section formed on the center section of the housing frame part, the housing frame part comprises at least one support section comprising a through opening extending through the center section of the housing frame part;
   wherein the at least one support section configured to support the filter element in the housing frame part when the filter element is inserted into the through opening.

2. The modular filter system according to claim 1, wherein the at least one housing frame part is four housing frame parts which are combined together to form the at least one duct or duct part and the at least one support section for at least one filter element.

3. The modular filter system according to claim 1, wherein at least one of the at least one housing frame part comprises at least one joining section joining with at least one adjacent housing frame part and/or joining with at least one functional component of the modular filter system.

4. The modular filter system according to claim 3, wherein at least one of the at least one housing frame part comprises at least one mounting section mounting at least one adjacent housing frame part and/or the at least one functional component of the modular filter system.

5. The modular filter system according to claim 1, wherein at least one of the at least one housing frame part comprises at least one frame part guiding means guiding at least one appropriate component guiding means of at least one functional component of the modular filter system.

6. The modular filter system according to claim 1, wherein at least one support of the at least one housing frame part comprises at least one supporting surface and/or supporting rib.

7. The modular filter system according to claim 1, wherein at least one housing frame part comprises at least one sealing guide for a gasket, with at least one sealing guide joining section and at least one sealing guide end section.

8. The modular filter system according to claim 1, wherein at least one housing module comprises at least two identical housing frame parts.

9. The modular filter system according to claim 1, wherein the at least one filter element is rectangular shaped.

10. A housing frame part of a housing module of a modular filter system for cleaning of gaseous fluid, wherein the housing module comprises
  at least one support for at least one filter element; and
  at least one duct or duct part for the gaseous fluid on the clean side of the at least one filter element;
wherein the housing frame part comprises at least one duct section;
wherein the at least one duct section forms at least one duct or duct part;
wherein the housing frame part is a rectangular half shell having a U-shaped profile, the housing frame part having:
a center section of the housing frame part;
a first side section forming a first leg of the U-shaped profile, the first leg having an end connected to a first end of the center section;
a second side section forming a second leg of the U-shaped profile, the second leg connected at an end to an opposite second end of the center section, the center section spacing the first leg apart from the second leg;
wherein the center section together with the first section and the second section form the U-shaped profile;
wherein a side of the housing frame part opposite the center section is open such that the first and second legs are connected to the housing frame part at only one end of each leg, an opposite end of the first and second legs being free;
wherein the housing frame part comprises at least one support section formed on the center section of the housing frame part, at least one support section comprising a through opening extending through the center section of the housing frame part;
wherein the at least one support section configured to support a filter element in the housing frame part when the filter element is inserted in the through opening;
wherein the housing frame part can be applied in the housing module such, that its at least one support section can be part of or form at least one support and/or its at least one duct section can be part of or form at least one duct.

11. A filter module for cleaning of gaseous fluid, comprising
a housing frame part according to claim 10;
a filter element arranged in the through opening of the housing frame part, wherein the at least one support section contacts and supports the filter element in the housing frame part;
wherein the at least one duct section for the gaseous fluid is on a clean side of the filter element;
wherein the at least one duct section forms at least one duct or duct part;
wherein at least one additional housing frame part is combined onto the housing module such, that its at least one support section can be part of or form at least one support and/or its at least one duct section can be part of or form at least one duct.

* * * * *